(12) United States Patent
Rosomoff

(10) Patent No.: US 11,086,762 B2
(45) Date of Patent: Aug. 10, 2021

(54) METHODS AND SYSTEMS FOR PREDICTING ESTIMATION OF PROJECT FACTORS IN SOFTWARE DEVELOPMENT

(71) Applicant: Express Scripts Strategic Development, Inc., St. Louis, MO (US)

(72) Inventor: Peter A. Rosomoff, Chesterfield, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 16/572,776

(22) Filed: Sep. 17, 2019

(65) Prior Publication Data

US 2020/0081823 A1 Mar. 12, 2020

Related U.S. Application Data

(63) Continuation of application No. 15/889,492, filed on Feb. 6, 2018, now Pat. No. 10,628,292, which is a continuation of application No. 15/248,229, filed on Aug. 26, 2016, now Pat. No. 10,055,337, which is a continuation of application No. 14/256,473, filed on Apr. 18, 2014, now Pat. No. 9,448,787.

(60) Provisional application No. 61/813,277, filed on Apr. 18, 2013.

(51) Int. Cl.
*G06F 8/70* (2018.01)
*G06F 8/30* (2018.01)
*G06F 8/10* (2018.01)
*G06F 11/36* (2006.01)
*G06Q 10/06* (2012.01)

(52) U.S. Cl.
CPC ............ *G06F 11/3668* (2013.01); *G06F 8/30* (2013.01); *G06F 8/70* (2013.01); *G06Q 10/0635* (2013.01); *G06F 8/10* (2013.01)

(58) Field of Classification Search
None
See application file for complete search history.

(56) References Cited

U.S. PATENT DOCUMENTS

| | | | | |
|---|---|---|---|---|
| 6,219,805 | B1* | 4/2001 | Jones | G06F 11/3616 714/25 |
| 7,337,124 | B2* | 2/2008 | Corral | G06Q 10/06 705/7.17 |
| 2010/0251215 | A1* | 9/2010 | Yawalkar | G06F 11/008 717/125 |

(Continued)

*Primary Examiner* — Isaac Tuku Tecklu

(57) ABSTRACT

Methods and systems for predicting estimation of project factors in software development environment are described. In one embodiment, a project analyst device receives first input data including at least one type of first software development model and associated one or more first project development data from a user. A feedback device loaded in a project estimation device identifies one or more first software project risk factors based on the at least one type of the first software development model. The project estimation device processes the one or more first project development data using the identified one or more first software project risk factors to identify one or more first intermediate data required for project factors estimation, and predicts estimations of the project factors using the identified one or more first intermediate data. Additional methods and systems are disclosed.

20 Claims, 24 Drawing Sheets

(56) References Cited

U.S. PATENT DOCUMENTS

| | | | |
|---|---|---|---|
| 2011/0067005 A1* | 3/2011 | Bassin | G06F 11/008 717/127 |
| 2014/0279387 A1* | 9/2014 | Shifman | G06Q 40/025 705/38 |
| 2014/0282406 A1* | 9/2014 | Narasimhan | G06F 11/008 717/124 |

* cited by examiner

800

METHODS AND SYSTEMS FOR PREDICTING ESTIMATION OF PROJECT FACTORS IN SOFTWARE DEVELOPMENT

CROSS-REFERENCE TO A RELATED APPLICATION

This application claims priority to and is a continuation application of U.S. patent application Ser. No. 15/889,492 filed on Feb. 6, 2018, said application claiming priority to U.S. patent application Ser. No. 15/248,229 filed on Aug. 26, 2016 and issued on Aug. 21, 2018 as U.S. Pat. No. 10,055,337, said application claiming priority to U.S. patent application Ser. No. 14/256,473 filed on Apr. 18, 2014 and issued on Sep. 20, 2016 as U.S. Pat. No. 9,448,787, said application claiming priority to and the benefit of U.S. Provisional Patent Application No. 61/813,277 filed on Apr. 18, 2013. The entire disclosures of the applications referenced above are incorporated by reference.

FIELD

The field relates to software development, and more particularly to determination of risks of introducing defects in software releases.

BACKGROUND

When software is written, the code may contain errors. The errors may take some time to identify and, once identified, may take additional time to resolve. The errors can result in increased costs, reduced performance, and customer dissatisfaction.

DETAILED DESCRIPTION

Figure 1:
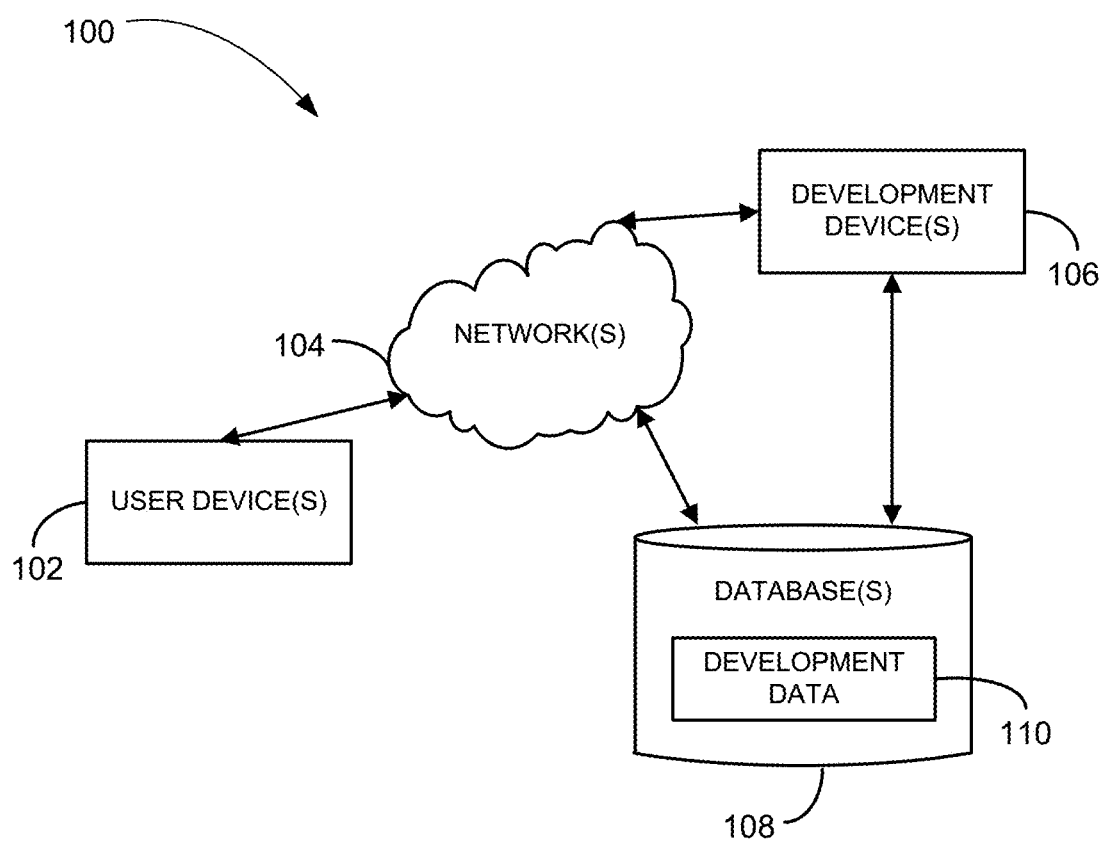
FIG. 1 is a block diagram of an example system, according to an example embodiment.

Example methods and systems for analyzing software development risks are described. In the following description, for purposes of explanation, numerous specific details are set forth in order to provide a thorough understanding of example embodiments. It will be evident, however, to one of ordinary skill in the art that embodiments of the invention may be practiced without these specific details.

During the course of software development, defects may be introduced into software programs. Defects may include any identifiable issues with software behavior, results, or product design. The greater the number and/or significance of the defects, the greater the likelihood that the usefulness of the software program and/or a user experience associated with the software application will be negatively impacted.

The methods and systems may predict the likelihood or risk of a defect being introduced into the final production version of a software application and prescribe mitigation techniques to lessen risk. The methods and systems may utilize risk factor identification, quantification of the risk factor measurement, algorithmic weighting, and confederation of the factors to produce a predictive scenario and prescription for mitigation.

In some embodiments, the prediction may include analysis of software development risks. Risk can represent a potential lack of quality in an end product program, while a defect reflects an actual lack of quality in the end product.

For example, risks may include the probability of a defect occurring once the software program has been deployed. For example, risks may be associated with introducing defects into a software program and/or a given release of a software application may be analyzed. In an example embodiment, mechanisms for the introduction of defects into a software program may be analyzed over a portion, or the entirety of the development cycle of a software program.

In an example embodiment, different risk factors for introducing defects into a software application may be measured at different points, or time periods or gates during the development cycle of the software program. The development cycle may extend from the concept, or idea stage, through the development stage (e.g., during which program code may be written and/or developed), the quality assurance and testing stage, and the deployment state. In some embodiments, different risk factors may have a different significance during one, or more than one, stages of the development cycle of the software application. In an embodiment, a weighting factor may be associated with one or more then on respective risk factors for determining a probability of the introduction of defects into the software application. In some embodiments, the risk factors are quantified risk factors.

In some embodiments, the methods and systems may allow risks of introducing defects into a software program to be determined (e.g., may allow a probability of introducing an unacceptably high level of defects into a software program may be determined) during various phases of a software development cycle (e.g., which may include early development stages, such as before program code has been written).

FIG. 1 is a block diagram of an example system 100, according to an example embodiment. The system 100 is an example embodiment in which software development risks may be analyzed. The system 100 includes a user device 102 in communication with a development device 106 over a network 104. The system may also include a database 108.

The user device 102 is used by a device operator. The device operator may be a user (e.g., an employee or contractor, etc.) associated with a software development project. Other device operators may also operate the user device 102.

The user device 102 may be a stand-alone device that solely provides at least some of the functionality to enable analysis of software development risks, or may be a multi-use device that has functionality outside of analysis of software development risks. Examples of the user device 102 include a set-top box (STB), a receiver card, a mobile telephone, a personal digital assistant (PDA), a display device, a portable gaming unit, and a computing system; however other devices may also be used. In some embodiments, the computing system may include a mobile computing device. For example, the user device 102 may include a mobile electronic device, such an IPHONE or IPAD device by Apple, Inc., mobile electronic devices powered by ANDROID by Google, Inc., and a BLACKBERRY device by Research In Motion Limited. The user device 102 may also include other computing devices, such as desktop computing devices, notebook computing devices, netbook computing devices, gaming devices, and the like. Other types of electronic devices may also be used.

The network 104 by which the user device 102 communicates with the benefit manager device 106, and/or the database 108 may include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may also include optical communications. Other conventional and/or later developed wired and wireless networks may also be used.

The development device 106 is a device operated by an entity at least partially responsible for the development of a software application. In some embodiments, the development device 106 may provide at least some of the functionality of analyzing software development risks. In some embodiments, the development device 106 may provide additional/alternative functionality. For example, in some embodiments, the development device 106 may provide functionality for developing a software requirement specification, carrying out software design and coding (e.g., which may include providing code editing and/or revision control functionality), software testing, and/or software deployment. The development device may provide additional and/or alternative functionality.

The user device 102 may be in a client-server relationship with the development device 106, a peer-to-peer relationship with the development device 106, and/or in a different type of relationship with the development device 106.

The development device 106 may be in communication directly (e.g., through local storage) and/or through the network 104 (e.g., in a cloud configuration or software as a service) with a database 108. The database 108 may be deployed on the user device 102, the development device 106, both the user device 102 and the development device 106, partially on the user device 102 and partially on the development device 106, on a separate device, or may otherwise be deployed. The database 108 may store development data 110.

The development data 110 may include, for example, data associated with the development of a software application. The development data 110 may include, for example, information regarding size and complexity of the software development project (e.g., anticipated number of development hours), milestone dates and estimates, information regarding the software development team (e.g., experience information, and the like), information regarding project scope changes and associated timeframes, information regarding identified defects, and the like. Additional/alternative information may also be included.

While the system 100 in FIG. 1 is shown to include single devices 102, 106, multiple devices may be used. The devices 102, 106 may be the same type of device or may be different device types. When multiple devices are present, the multiple devices may be of the same device type or may be a different device type. Moreover, system 100 shows a single network 104, however, multiple networks can be used. The multiple networks may communicate in series with each other to link the devices 102, 106 or in parallel to link the devices 102, 106.

Figure 2:
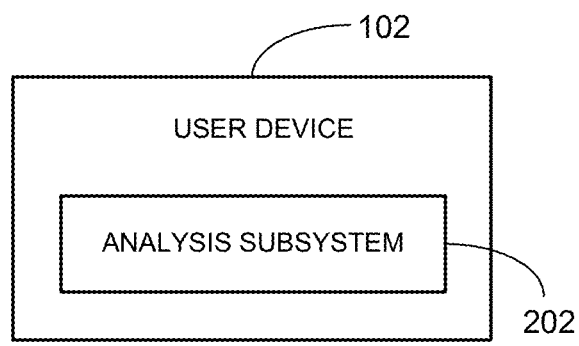
FIG. 2 is a block diagram of an example user device that may be deployed within the system of FIG. 1, according to an example embodiment.

FIG. 2 illustrates the user device 102, according to an example embodiment. The user device 102 may be used by a device operator to determine analyze software development risks. The user device 102 may be deployed in the system 100, or may otherwise be used.

The user device 102 may include an analysis subsystem 202. The analysis subsystem 202 may analyze software development risks.

Figure 3:
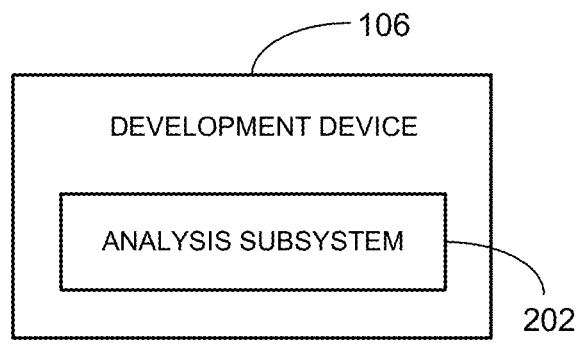
FIG. 3 is a block diagram of an example development device that may be deployed within the system of FIG. 1, according to an example embodiment.

FIG. 3 illustrates the development device 106, according to an example embodiment. The development device 106 may be deployed in the system 100, or may otherwise be used. The development device 106 may include the analysis subsystem 202. In some embodiments, the analysis subsystem 202 when used may provide server-side functionality to the user device 102. By way of example, the analysis subsystem 202 may be at least partially deployed in both the user device 102 and the development device 106. The user device 102 may then perform some of the functionality while other functionality is performed by the development device 106.

Figure 4:
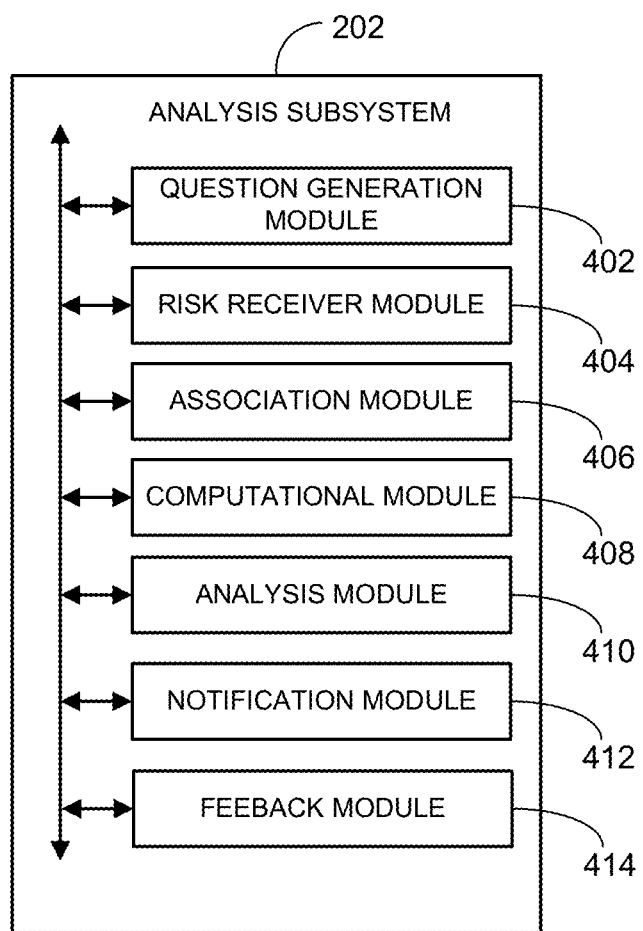
FIG. 4 is a block diagram of an example analysis subsystem that may be deployed within the user device of FIG. 2 or the development device of FIG. 3, according to an example embodiment.

FIG. 4 illustrates an example analysis subsystem 202 that may be deployed in the user device 102, the development device 106, or otherwise deployed in another system. One or more modules are communicatively coupled and included in the analysis subsystem 202 to analyze software development risks. The modules of the analysis subsystem 202 that may be included are a question generation module 402, a risk receiver module 404, an association module 406, a computational module 408, an analysis module 410, a notification module 412, and a feedback module 414. Other modules may also be included.

In some embodiments, the modules of the analysis subsystem 202 may be distributed so that some of the modules are deployed in the user device 102 and some of the modules are deployed in the development device 106. In one embodiment, the modules are deployed in memory and executed by a processor coupled to the memory. The functionality contained within the modules 402-412 may be combined into a lesser number of modules, further divided among a greater number of modules, or redistributed among existing modules. Other configurations including the functionality of the modules 402-412 may be used.

In some embodiments, the analysis subsystem 202 may measure one, or more than one, risk factor associated with the development of the software application. The risk factor generally reflects a quantitative software development risk associated with the software development process. For example, the risk factor may be a number in a range of permitted numbers (e.g., 1-10, 1-100, 0%-100%). The number may be discrete or otherwise.

Risk factors or metrics may be chosen for their impact, objectivity, and measurability. Example categories of risk factors include size and complexity, project, testing, and staffing methods. Size and complexity may include system dependencies and impact, scope, non-code related changes, and data structure. Project may include planning effectiveness, schedule dependencies, phase duration, and late changes. Testing may include defects and test completion and/or coverage. Staffing methods may include level of supervision and resource churn.

The one or more risk factors may be measured at one or more time periods or gates during the software development process. In some embodiments, the risk factors may be measured at multiple different gates. In some embodiments, the risk factors may reflect internal questions regarding the status of a software development project. Different risk factors may be used for different projects at an organization, different organizations, different types of software development, or otherwise. In some embodiments, the selected risk factors may contribute to the determination of a risk profile for the software development.

The time periods or gates may reflect various milestones in the software development lifecycle in which data is collected for analysis. The analysis subsystem 202 may have a single time period or gate (e.g., before software release), or may include a number of time periods or gates such as 4 or 5 at various instances prior to software release. Example gates may include a requirements gate, a design gate, a build gate, a test gate, a pilot gate, and a deploy gate. The development lifecycle may include a design complete gate, a code complete gate, a quality assurance test complete stage, a regression test complete stage, and a pre-launch evaluation stage.

Risk factors are measured against each milestone (or phase or gate) and often measured at every milestone. Risk factors that are measured just at one milestone are "snapshot" or static. For example, the date that the design was completed is a one-time milestone measurement, or snapshot.

If a risk factor is measured at multiple milestones it may be considered temporal or dynamic and how the measurement changes over time as well as its measured value. For example, the number of allocated QA hours might change over the course of development, indicating an increase in complexity, code defects, requirements/scope addition, or additional testing being requested due to external concerns. The methods and systems focus on the change in allocated QA hours as an indicator of risk. Another example may include requirements churn as another temporal indicator. While some level of churn may be deemed acceptable overall, a determination may be made that such churn is more acceptable in the early stages of development and not at the end. A sharp increase in requirements churn late in the lifecycle might be an indicator of risk.

Risk factors may be specific to a project, scope item or component of a software release, or they may be specific to the entire release itself. For example, the design of projects/scope items/components may be completed at various times during the release lifecycle. Depending on the project/scope item/component various dates may be found to be acceptable. This type of risk factor is typically measured at the project level.

Release risk factors may be specific to the release as a whole. For example, regression, integration and performance testing, which examine the entire code release and all components working together may only be measureable at the release level. The estimated release date itself is another release specific factor.

Some risk factors may have no relationship to other risk factors and are therefore independent. Many risk factors may become more important to the overall score as other risk factors change. These risk factors may be deemed influenced or dependent risk factors. If a dependency is observed, the methods and systems may add a new risk factor that calculates the dependency impacts.

Examples of release specific risk factors may include Estimated QA Start, Estimated QA End, Estimated Pilot Start, Estimated Pilot End, Estimated Deploy, Actual QA Start, Actual QA End, Actual Pilot Start, Actual Pilot End, Actual Deploy, Regression Critical Found, Regression High Found, Regression Med Found, Regression Low Found, Regression Critical Resolved, Regression High Resolved, Regression Med Resolved, Regression Low Resolved, Regression Critical Deferred, Regression High Deferred, Regression Med Deferred, Regression Low Deferred, All Code in QA, and Load Test Successful.

Risk factors may be identified through investigation into raw defect data and root cause analysis. In some embodiments, the risk factors may be categorized after identification. Examples of categorization include static configuration, dynamic configuration, temporal metrics, and accumulating metrics. Static configuration may include risk factors are set early in the process and may not change during the lifetime of the development effort. Changes to static configuration may be obtained at key milestones. Dynamic configuration may include risk factors that are periodically evaluated and expected to have some fluctuation. The raw values, rate of change, and timing of change in regards to the software development life cycle may be measured at defined points. Temporal metrics may include risk factors that are based on target dates/times for various processes to complete and/or start. Differences between actual start and end date/times and estimates may be measured. Changes to estimates may be measured, and the timing of the change in regards to the software development life cycle may be measured. Accumulating metrics include risk factors that are based on measurements that grow over time through the process, such as hours spent on a task, defects detected in QA, requirements developed, etc. These risk factors may be measured throughout the software development life cycle and the timing of any change in regards to the software development life cycle may be measured.

In an implementation, the risk factors may be measured by the question generation module 402 generating risk factor questions associated with a software development process of a software program during a software development stage in which the software program is being created or will be created. A risk factor question may request information utilized to assess software development risk associated with a particular software development activity. In general, the risk factor question is a developmental question regarding status of software development of a software program.

In some embodiments, the question generation module 402 identifies a company, an organization, a department, or combinations thereof. The risk factor questions may then be selected based on identification of the company, the organization, the department, or combinations thereof. The risk receiver module 404 receives risk factor responses associated with the software development process of the software program. A risk factor response may be made in response to a risk factor question.

The risk factor response may include the risk factor, the risk factor may be derived from the risk factor response (e.g., the risk receiver module 404 may translate "high", 'medium", or "low" into a numeric value), or otherwise. In some embodiments, the risk factor response includes the risk factor. In some embodiments, risks factors may be cross dependent on one or more than one other risk factor.

Example risk factors that may be measured include defects in product severity, schedule, cost, scope, and customer satisfaction. The measured risk factors reflect risk associated with the process of developing software instead of risk associated with the code development. In some embodiments, the risk associated with the code development may incur late or at the end of the software development process, where the risk associated with the process of developing software may incur much earlier (e.g., before coding begins, in the initial coding stages, before coding is substantially complete, and the like) in the process.

In some embodiments, the risk receiver module 404 may include or communicate with an analysis engine such as a software lifecycle management tool, software testing tool, or integrated development environment to receive data and the data may be used as described above.

The association module 406 respectively associates risk factors with a risk factor models and risk factor weightings. In general, each risk factor has its own respective risk factor and risk factor weighting. In some embodiments, a risk factor may be related to another risk factor and utilize the risk factor and/or right factor weighting of another factor. In some embodiments, one or more than one of the risk factors are independent from the other risk factors. In some embodiments, the association of a risk factor with a risk factor model and risk factor weighting maps the risk factor into an amount of risk that the particular risk factor presents to the software development.

In general, a risk factor model reflects a mathematical relationship between the risk factor and a risk factor weighting. Examples of risk factor models include a binary model, linear model, a geometric model, a quadratic model, an exponential model, a step model, a custom model, or the like.

The risk factor weightings may act as coefficients that allow for amplification or de-amplification of a risk factor's impact without changing the basic "shape" of its impact.

The risk factor model and risk factor weighting used may be a system default (e.g., linear and a weighting of 1), may be selected or derived by the developer or another person, may be selected and/or revised by use of the feedback module 414, or otherwise.

The association module 406 may associate one, or more than one, weighting factors with each of the risk factors. In some embodiments, the weighting factor may be based on the risk factor and the gate (e.g., time period at which the risk factor was measured). In an embodiment, based on the measured risk factor(s) and the weighting factor(s) a probability may be determined that a defect level may exceed a threshold level. An example of gates may include an execution gate, a development gate, an integration gate, a quality assurance gate, a pilot gate, a deployment review gate, and a go or no go decision gate.

In some embodiments, the weighting factors may vary depending upon project attributes and/or requirements. As such, in some embodiments, the weighting factors may be developed and refined based on historical data. In some embodiments, the weighting factors may be developed based on regression analysis of historical data. The developed factors may then be used in the association performed by the association module 406.

The computational module 408 totals the risk factors in combination with their respective association of the risk factor models and the risk factor weightings to generate a predicted number of expected software development defects associated with continued development of the software program.

A risk profile may be established by the computational module 408 as the measured amount of risk of software defects due to the software development process at a particular point in time or at a particular gate. As a result, an organization may determine to halt the software development, may break the project into multiple smaller projects, may add more testing time, or otherwise mitigate risk. In some embodiments, based on the risk flagged, a suggested set of solutions may be generated to indicate possible ways to reduce risk.

In some embodiments, the predicted number of defects may be determined by the computational module 408 to a high degree of confidence. In some embodiments, determining an amount of risk and/or a predicted number of software defects by the computational module 408 may enable improved management of risk. For example, as a result of determinations, a project may be determined to be too big or complex and the project may get broken up into smaller pieces, additional support may be provided to a project, the project may not get bundled with other projects, warnings may be provided to internal and/or external customers, or the like.

In some embodiments, the analysis module 410 analyzes the risk factors in combination with their respective association of the risk factor models and the risk factor weightings to flag a software development risk area. The notification module 412 may then generate a notification based on flagging of the software development risk area.

In some embodiments, the analysis module 410 may allow probabilities to be determined of software application defects exceeding an acceptable threshold.

In some embodiments, the determination of risks of introducing defects into a software application may allow for risk mitigation. For example, in some embodiments, risk mitigation may include changing one or more project and/or development attributes. Changes in project and/or development attributes may, for example, change the risk factors and/or weighting factors associated with risks of introducing defects. Accordingly, in some embodiments, analysis of software development risks may allow the implementation of risk mitigation to achieve an acceptable level of risk associated with the development of a software application. The risk mitigation may occur due to the analysis performed by the analysis module 410 and/or the notification generated by the notification module 412.

An example of possible risk mitigation that may be included in the notification includes designing out the risk, adding more time to the schedule, removing scope from the project, adding more resources, performing additional testing, and conducting process improvement and training.

In some embodiments, the analysis module 410 selects a possible developmental solution among possible developmental solutions based on flagging of the software development risk area. The notification may then include indicia of the possible developmental solution.

In some embodiments, the analysis module 410 may provide alternative predictions demonstrating the impact of implementing various developmental solutions or imagined future conditions In some embodiments, the analysis module 410 derives the risk factor from the risk factor response.

In some embodiments, the analysis module 410 collects a number of defects identified in the software code. The collection may occur during quality assurance testing, during end user testing, during both quality assurance testing and end user testing, or otherwise.

In some embodiments, the feedback module 414 compares the measurement of risks factors and weighting factors, and the determination of probabilities of introducing defects into a software application against historically derived standards and/or historically derived data. The historically derived standards and/or historically derived data may include information about risk factors associated with prior development projects and/or segments and outcomes (e.g., introductions of defects into software applications) associated with the prior development projects and/or segments. In an embodiment, the measurement of risk factors, determinations of weighting factors associated with the risk factors, and the determination of probabilities of risks of introducing defects into a software application may be implemented in a feedback loop. In such an embodiment, as more historical data is generated (e.g., based on the development of additional software applications) analytical techniques, such as regression and/or correlation analysis, may be implemented to refine the weighting factors associated with various risk factors to allow the determination of risk probabilities having a greater accuracy and/or confidence interval.

In some embodiments, the feedback module 414 may include a learning engine that may be used to select and/or revise risk factors, risk factor models, and risk factor weightings. In some embodiments, the selection and/or revising may produce more accurate results. The feedback module 414 may act across a single software development, a related series of software development projects, or multiple software developments that include related and/or unrelated projects. The learning engine may include experiment type analysis, regression analysis, or other analysis.

In some embodiments, certain risk factors may be identified by or through use of the feedback module 414 as having greater or lesser importance. For example, a risk factor that does not impact nor has little impact on determining software development risks may not be considered for some or all future software development for a particular project, a particular organization, or more generally for future analysis.

The feedback module 414 may adjust the model, the weightings, the risk factors, or combinations thereof based on analysis performed. The analysis may be performed computationally by the feedback module 414, may be performed by a person with the result provided to the feedback module 414, or otherwise. In some embodiments, the feedback module 414 may establish a confidence level based on the accuracy of the predicted number of defects relative to the actual number of defects measured.

In some embodiments, the feedback module 414 enables continuously self-tuning to maximize the confidence of the predictions.

In an implementation, the risk factors may be measured by the risk receiver module 404 receiving risk factor data of risk factors associated with the software development process of a software program. The association module 406 respectively associates the risk factors with a risk factor models and risk factor weightings. The computational module 408 then totals the risk factors in combination with their respective association of the risk factor models and the risk factor weightings to generate a predicted number of expected software development defects associated with continued development of the software program. Other measurements of risk factors may also be used.

Figure 5:
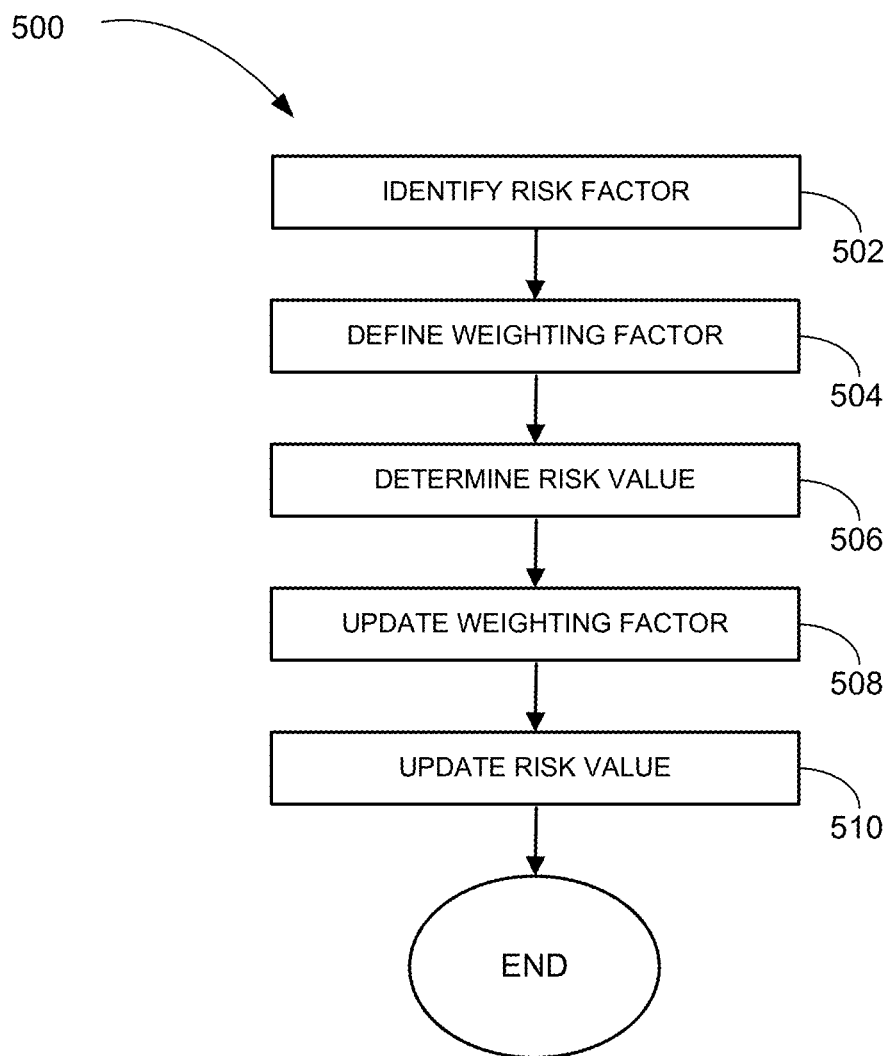
FIGS. 5 and 6 are process flows illustrating methods for analyzing software development risks, according to example embodiments.

FIG. 5 illustrates an example method 500 for analyzing software development risks, according to an example embodiment. The method 500 may be performed by the user device 102, by the development device 106, partially by the user device 102 and partially be the development device 106, or may be otherwise performed.

One or more than one risk factors may be identified at block 502. The one or more risk factors may include any attributes and/or characteristic of a software development process that may introduce and/or influence the occurrence of defects in the software project. Examples of risk factors may include, but are not limited to, the size and complexity of the software development project and software application, experience of the software development team, the involvement of subject matter experts, and external dependencies. One, or more than one, risk factor may be identified at block 502.

A weighting factor associated with each risk factor may be defined at block 504. In an embodiment, the weighting factor may be based upon, at least in part, historical software development data. The historical software development data may include, for example, risk factors associated with previous software development projects and/or previous stages of a current software development project and defect data relating to the previous software development project and/or previous stage of the current software development project. In some embodiments, the weighting factor may be based on a regression analysis of the historical software development data.

A risk value may be determined at block 506. In an embodiment, the risk value may be based on the one, or more than one, risk factors and the associated one, or more than one, weighting factor. In an embodiment, the risk value may provide a probability that a number of defect associated with a software application may be below a threshold number of defects. In other embodiments, the risk value may otherwise indicate a probability of defects associated with a software development project.

In an embodiment, one or more weighting factors may be updated at block 508. Updating the weighting factor may include, for example, updating the weighting factor based on additional historical software development data and/or based on historical software data associated with a new time period (e.g., gate) in the current software development process.

In an embodiment, the risk value may be updated at block 510 based on the updated weighting factor. Updating the risk value may include determining a risk value based on one or more identified risk factors and one or more associated weighting factors and/or associated updated weighting factors.

Figure 6:
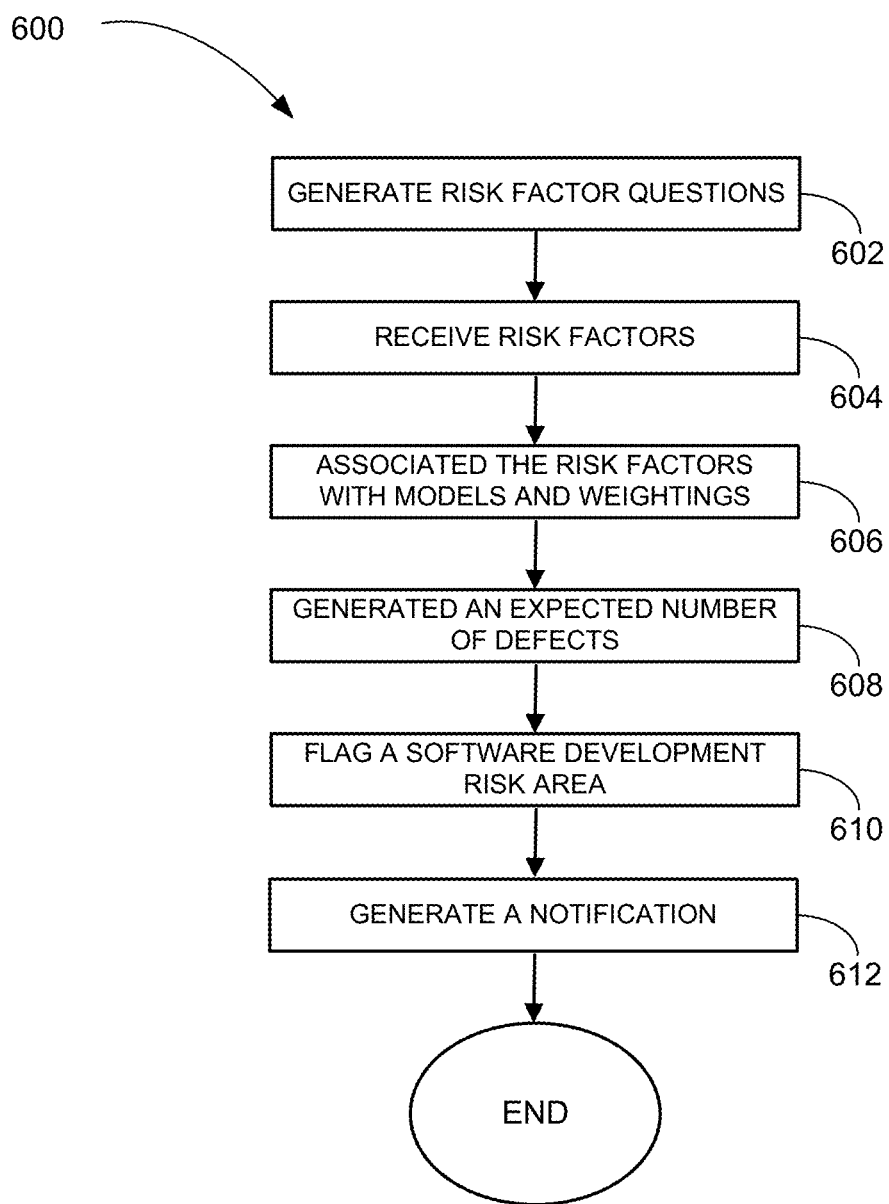

FIG. 6 illustrates an example method 600 for analyzing software development risks, according to an example embodiment. The method 600 may be performed by the user device 102, by the development device 106, partially by the user device 102 and partially be the development device 106, or may be otherwise performed.

In some embodiments, at block 602 risk factor questions associated with a software development process of a software program are generated during a software development stage in which the software program is being created or will be created. In some embodiments, a company, an organization, a department, or combinations thereof is identified and risk factor questions are selected based on the identification.

Risk factor responses associated with the software development process of the software program are received at block 604. In some embodiments, the risk factor is derived from the risk factor response.

In some embodiments, risk factor data of risk factors associated with the software development process is received at block 604.

Risk factors are respectively associated with risk factor models and risk factor weightings at block 606. The risk factors are totaled in combination with their respective association of the risk factor models and the risk factor weightings at block 608 to generate a predicted number of expected software development defects associated with continued development of the software program.

In some embodiments, risk factors are analyzed at block 610 in combination with their respective association of the risk factor models and the risk factor weightings to flag a software development risk area. At block 612, a notification may be generated based on flagging of the software development risk area. In some embodiments, a possible developmental solution is selected among possible developmental solutions based on flagging of the software development risk area. The notification may then include indicia of the possible developmental solution.

In various implementations of the method 600, the number of risk factors may change and, in some embodiments, may be configurable. The flexibility in the risk factors may provide a framework for evaluation of a variety of software development projects.

In some embodiments, the methods and systems provide a risk measurement and process methodology that focuses on improving the quality of software products. The methods and systems may provide:

Periodic analysis of release component and overall release quality/risk metrics

Alerts to pro-actively engage risk mitigation processes intelligent decision support for release activities such as reports and dashboards Continuous improvement capabilities such as process improvement and data analysis FIGS. 7-19 are example displays, according to example embodiments. The displays include example user interfaces and/or example data that may be generated by the analysis subsystem 202 and ultimately presented to an operator of the user device 102. However, other types of displays and modifications to the displays may additionally or alternatively be presented.

Figure 7:
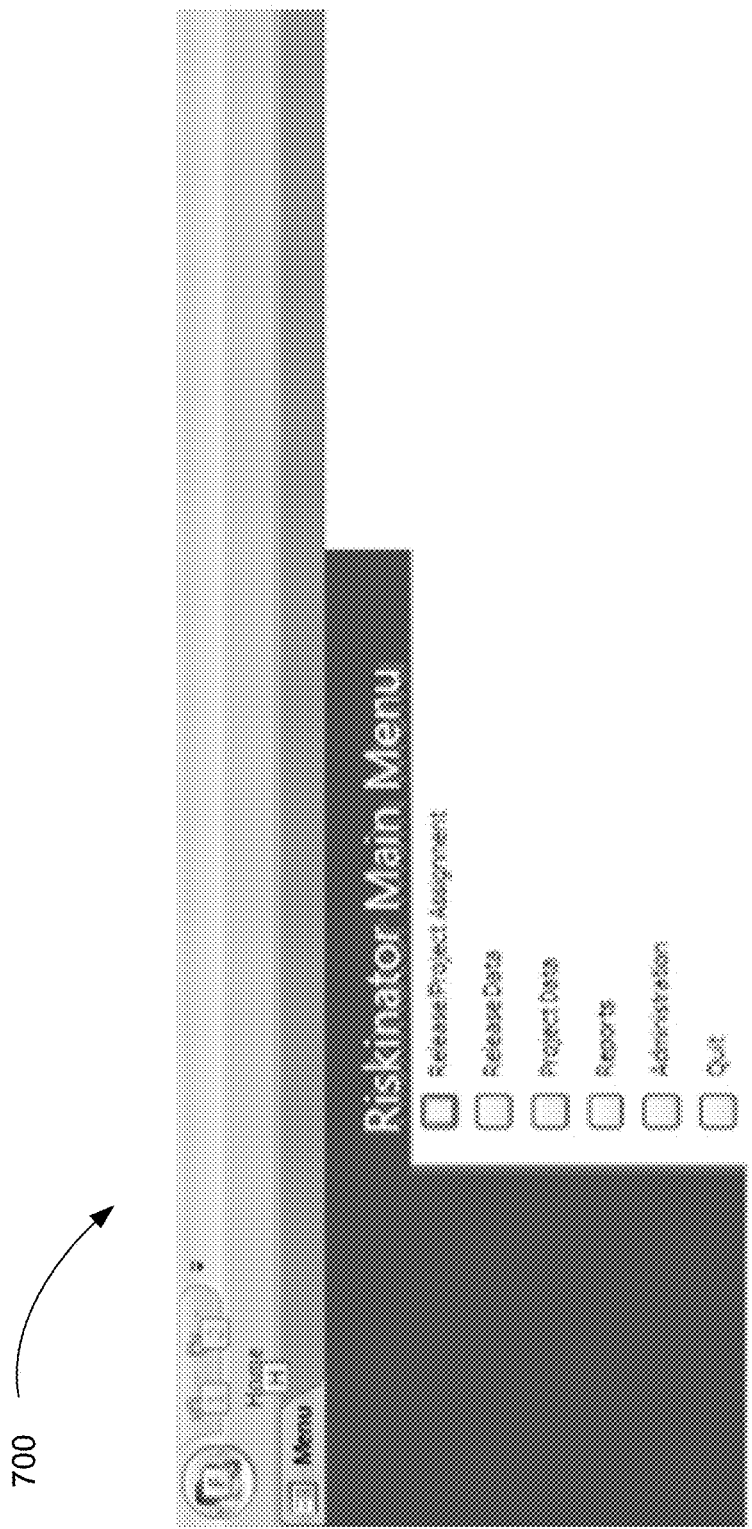
FIGS. 7-24 are example displays according to example embodiments.

FIG. 7 includes a display 700 that reflects a main menu from which projects and/or scope may be assigned to a scheduled release of software, release focused risk data can be entered/viewed, project focused risk data can be entered/viewed, report menu may be accessed, administrative task menu (software related tasks like backup, etc.) may be accessed, or the user may quit.

Figure 8:
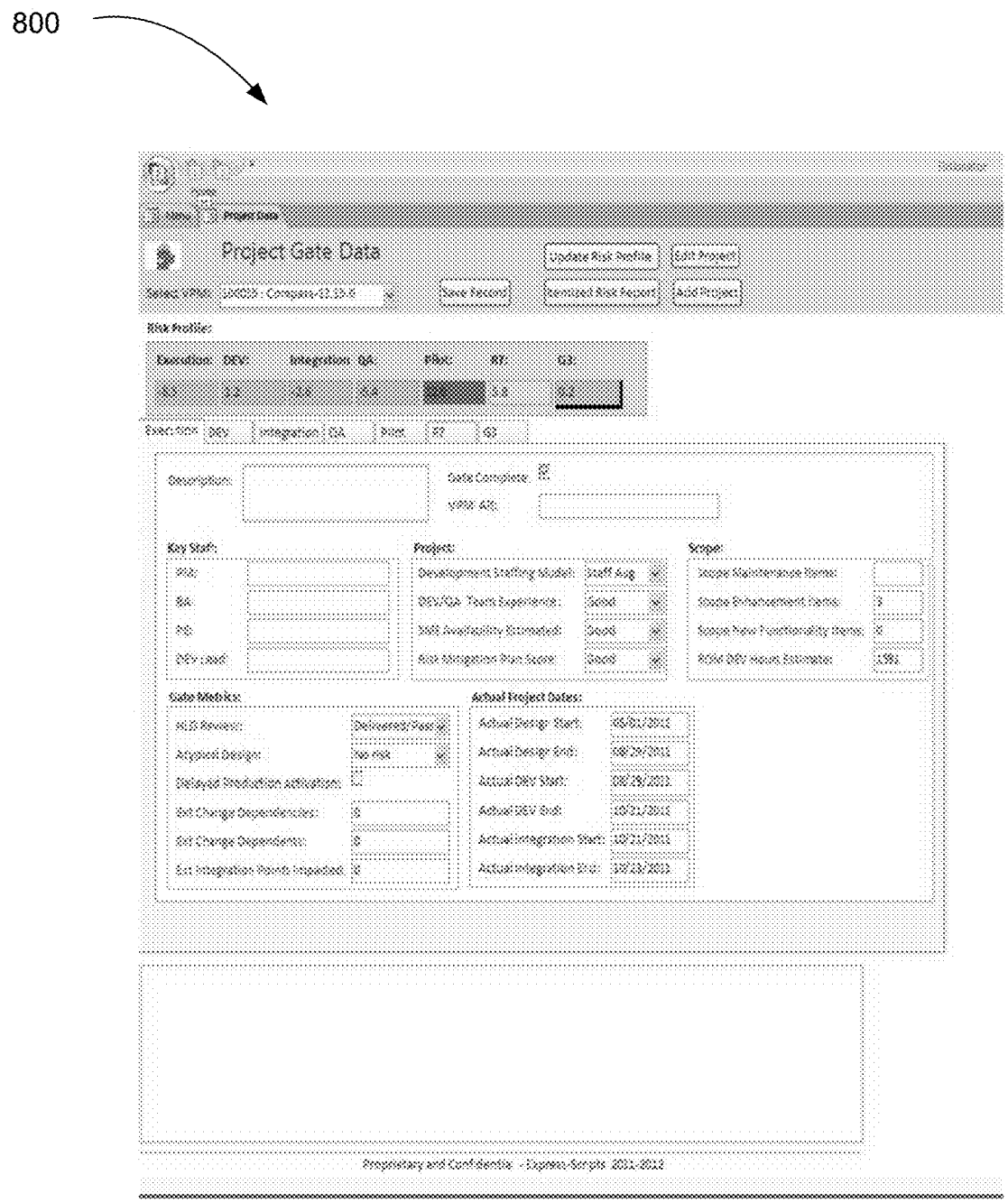

FIG. 8 includes a display 800 that reflects an example of a project data entry screen, where data can be entered for project focused risk factors. Several tabs are include (e.g., Execution, DEV, Integration, QA, Pilot, R7, G3) that are example of milestones in the software development lifecycle where risk profiles may be evaluated and data collected.

The display 800 shows several risk factor categories shown including Key Staff, Project, Scope, Gate, and Project Schedule. In general, risk categories are functional groupings to make entry and evaluation of data more understandable. They may change from tab to tab. Risk factors may change from tab to tab. The selection of categories and factors to display may be managed by the analysis subsystem 202.

Once data is collected, the profile may be calculated and reports may be generated. Final risk profile scores (in this example the G3 milestone) may be modeled automatically on a "most probable case" basis without any future milestone data. Data in future milestones may be entered to model "what if" scenarios that represent planned mitigation or known extraordinary risks.

Risk profile numbers for the project may be reflected in green, red, yellow colored boxes above the tabs. Color shading may be represent thresholds of concern with red in this example being critical warning.

Figure 9:
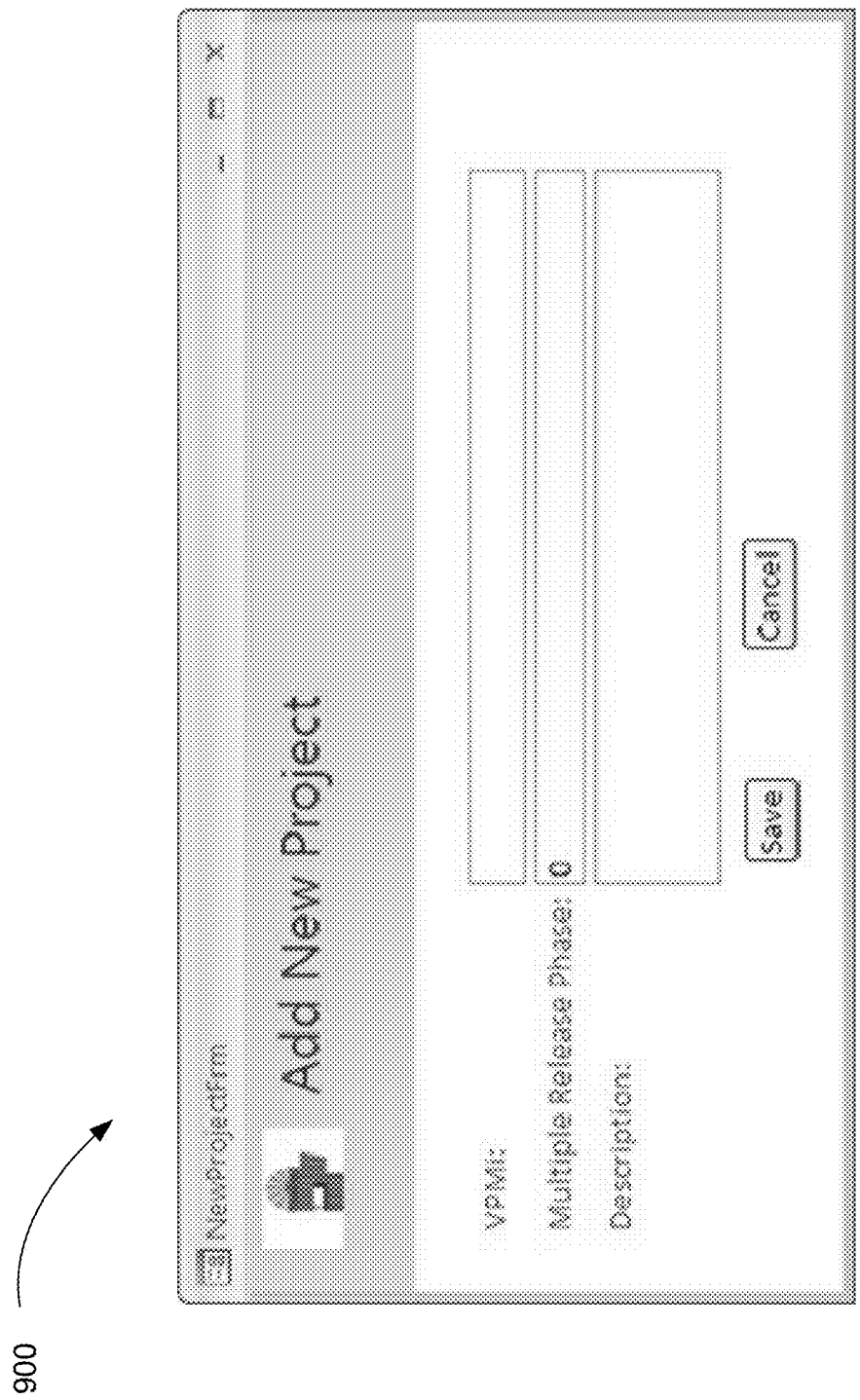
Figure 10:
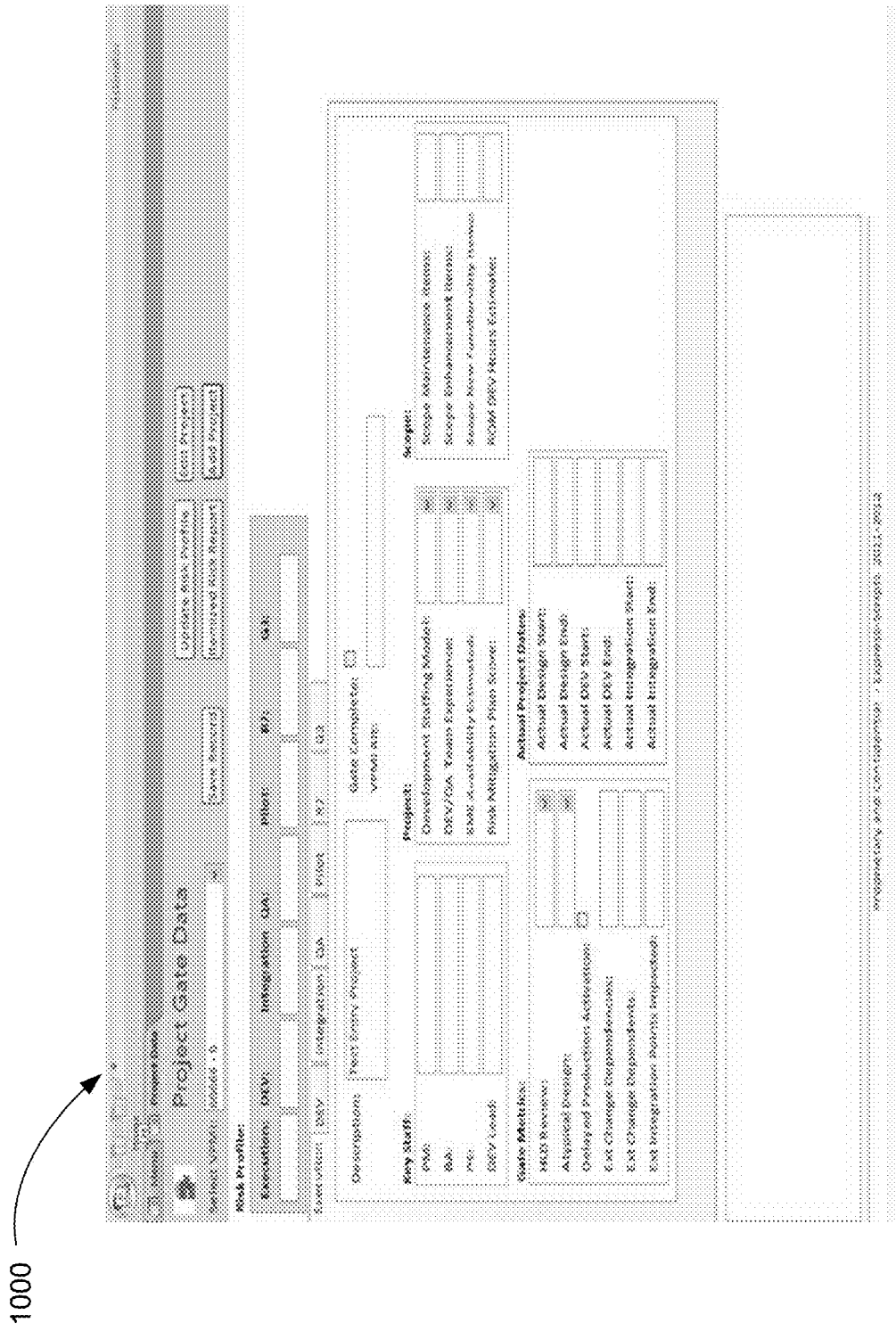
Figure 11:
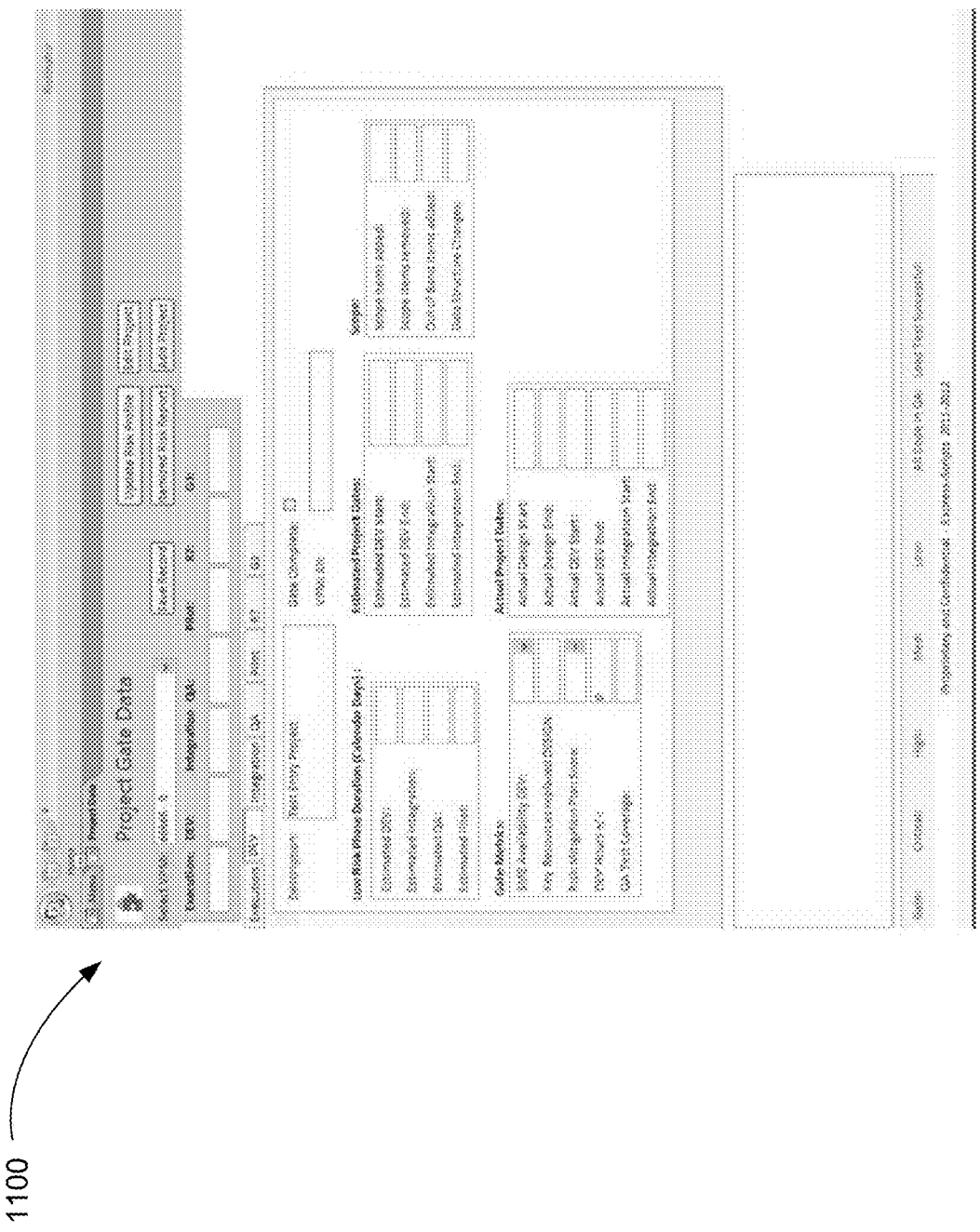
Figure 12:
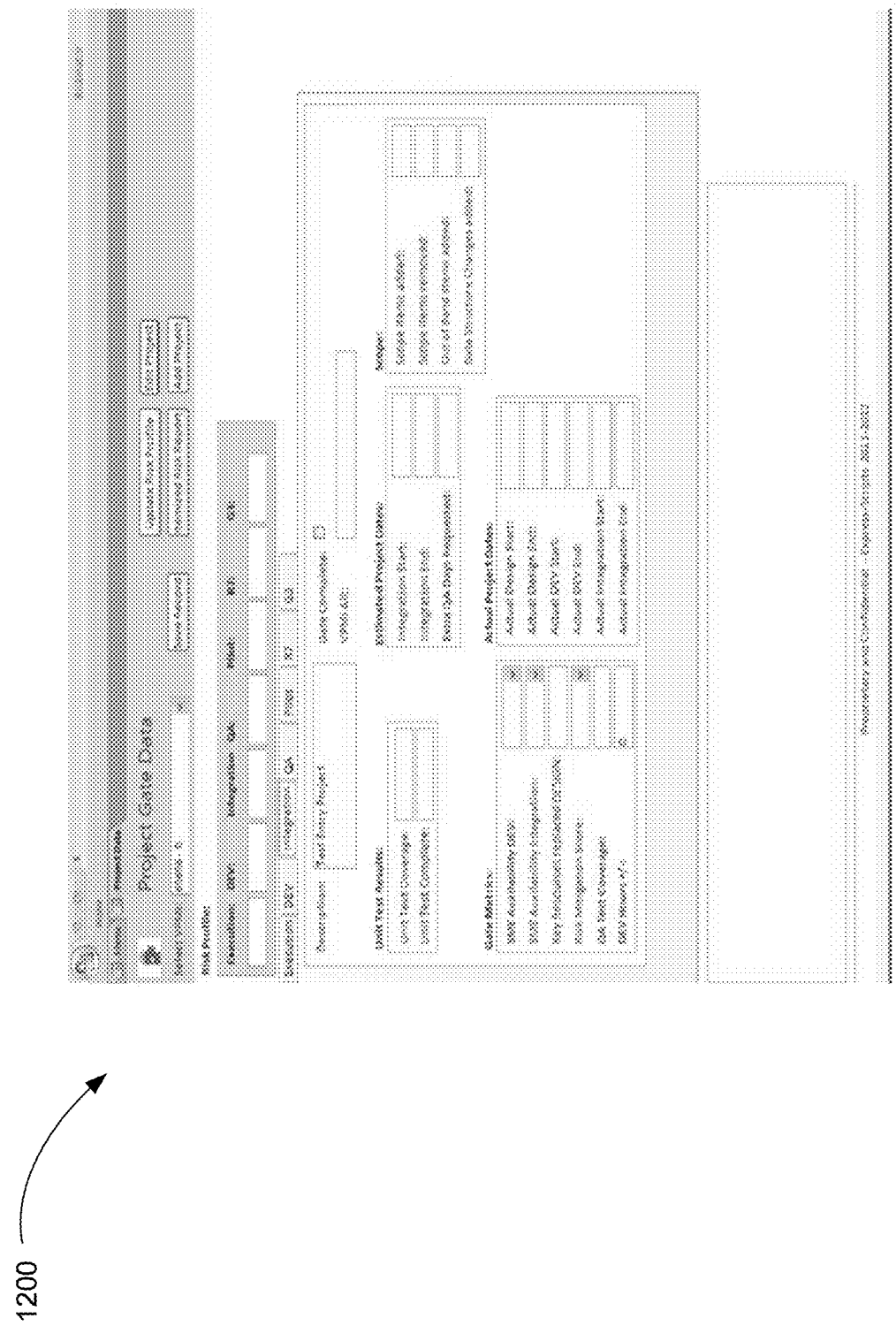
Figure 13:
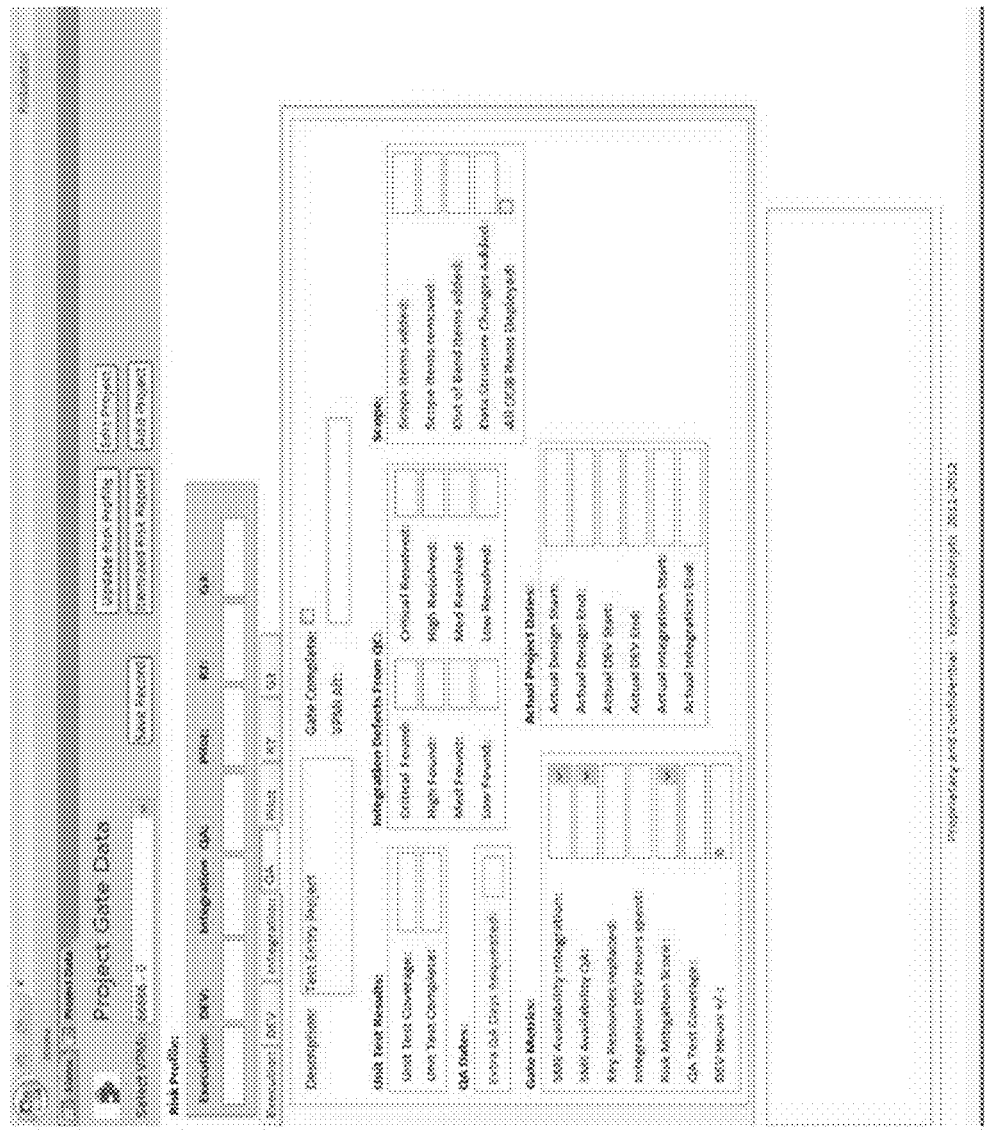
Figure 14:
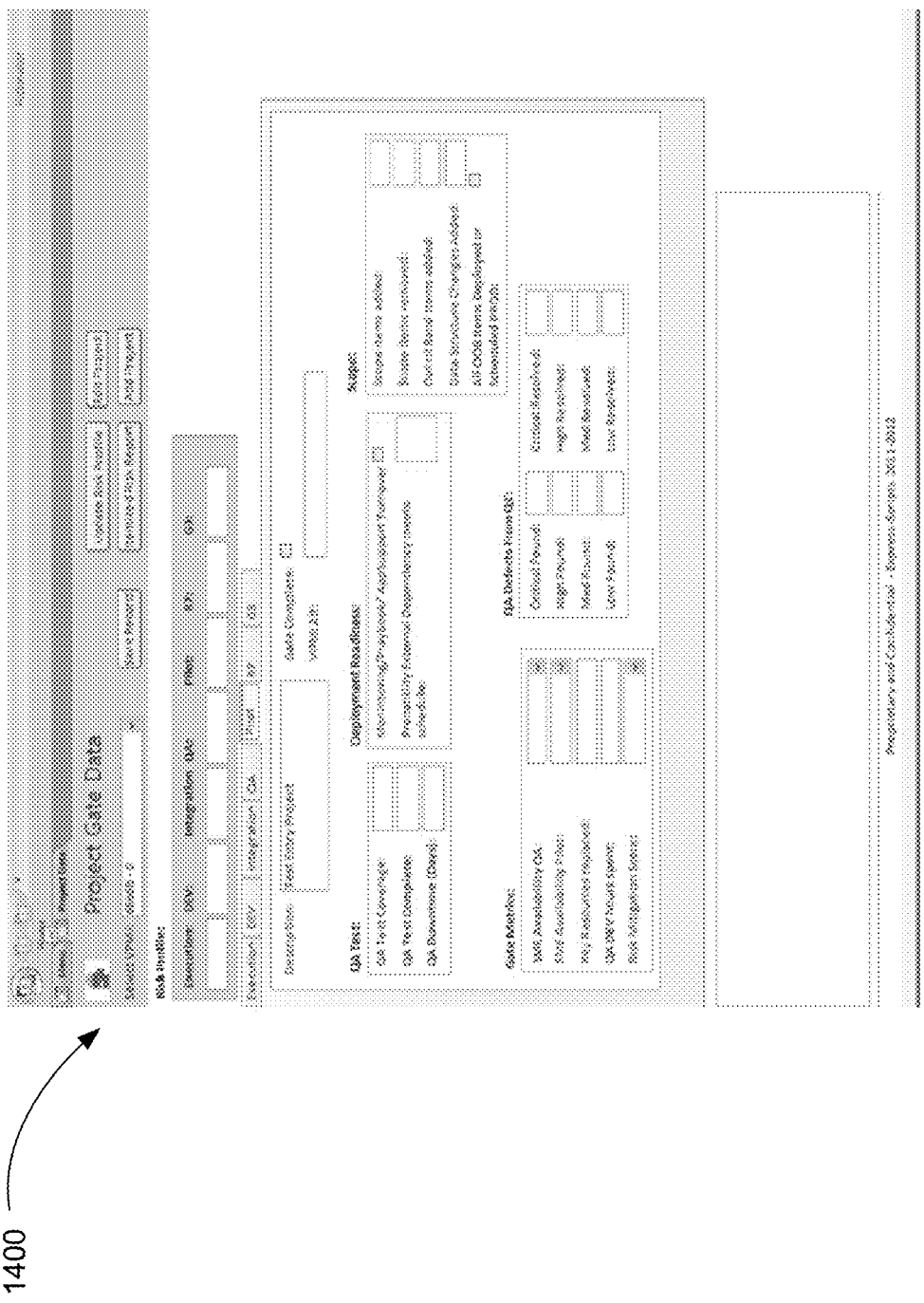
Figure 15:
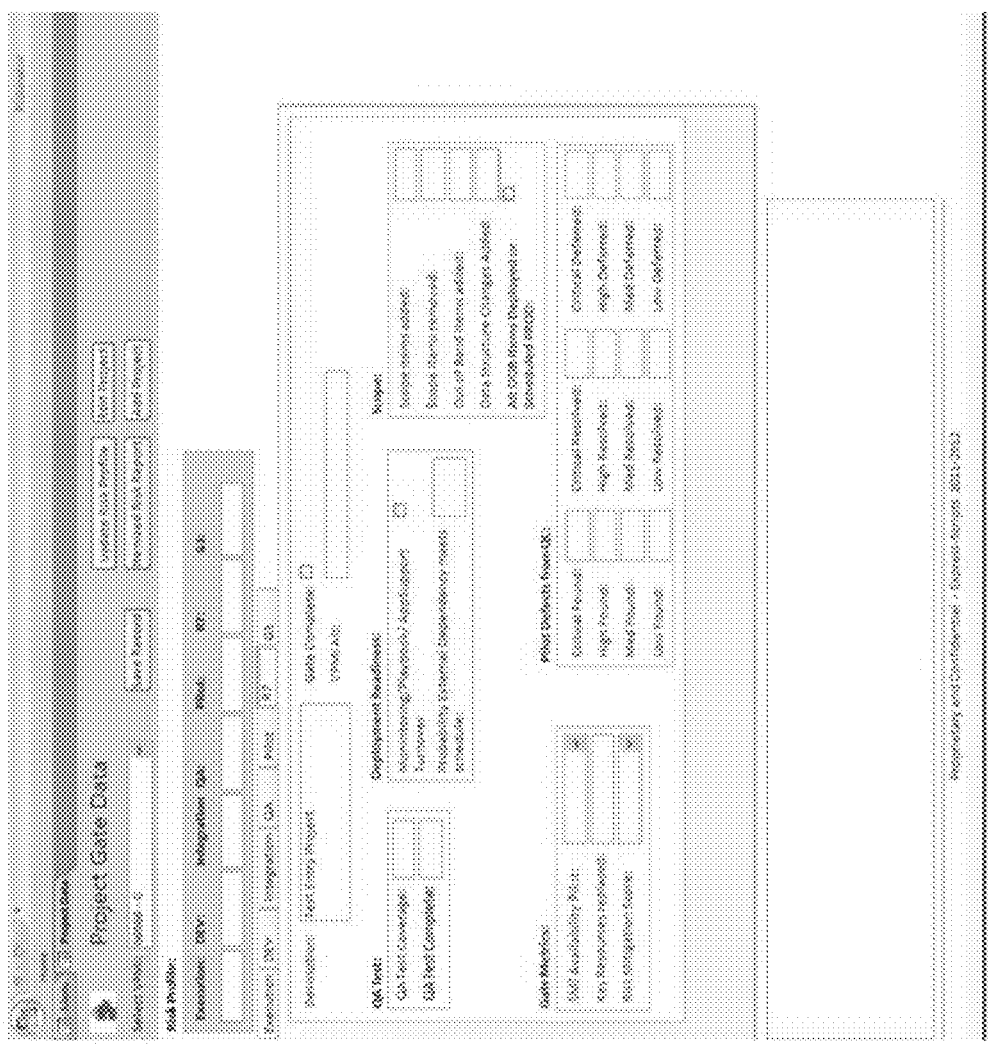
Figure 16:
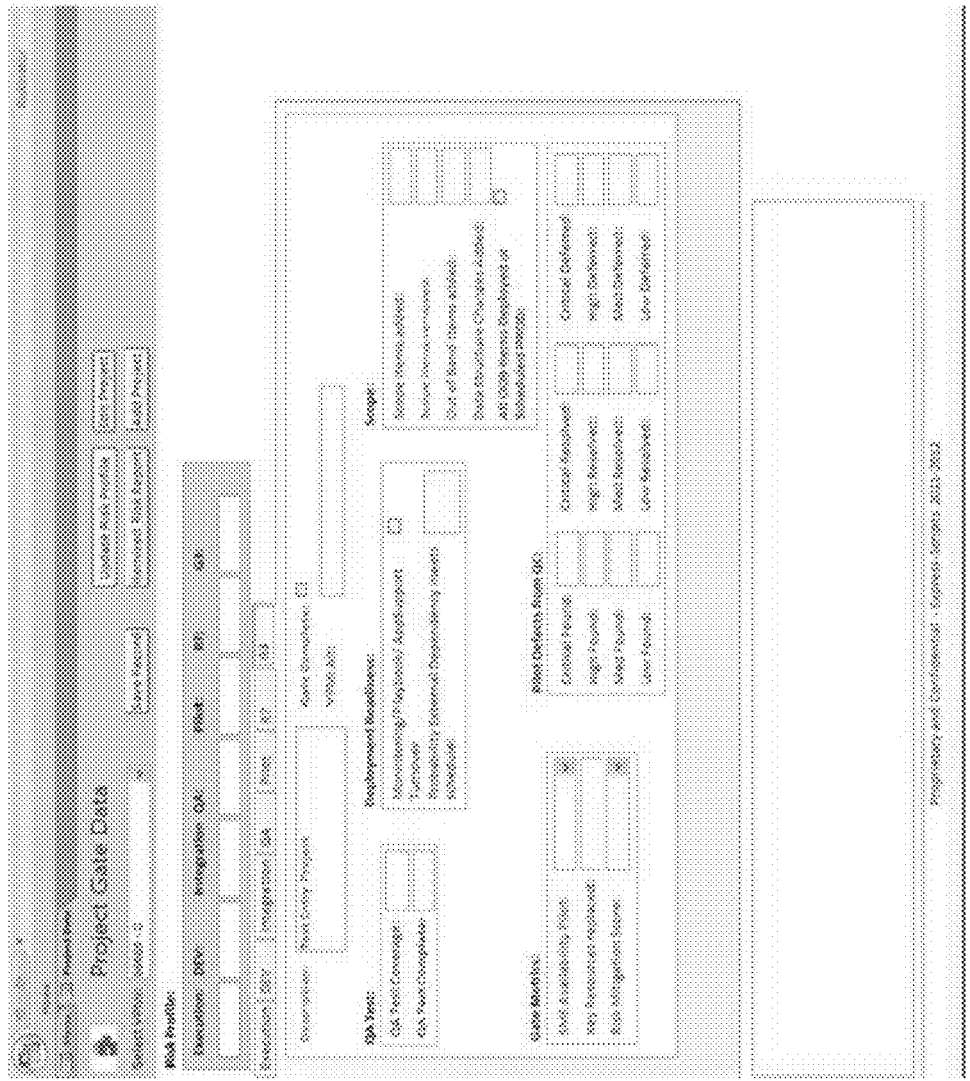

FIG. 9 includes a display 900 that reflects a display to allow new projects (scope) to be added to the system. In some embodiments, it may not be known when projects are initiated which release they will be assigned. Projects may proceed through multiple milestones and then be assigned to a release. The release risk profile may include an aggregation of individual project risk profiles.

FIGS. 10-16 include displays 1000-1600 are similar to the display 800 and show a new project at the different milestones with various categories and risk factors displayed. No risk profile numbers are shown to be present.

Figure 17:
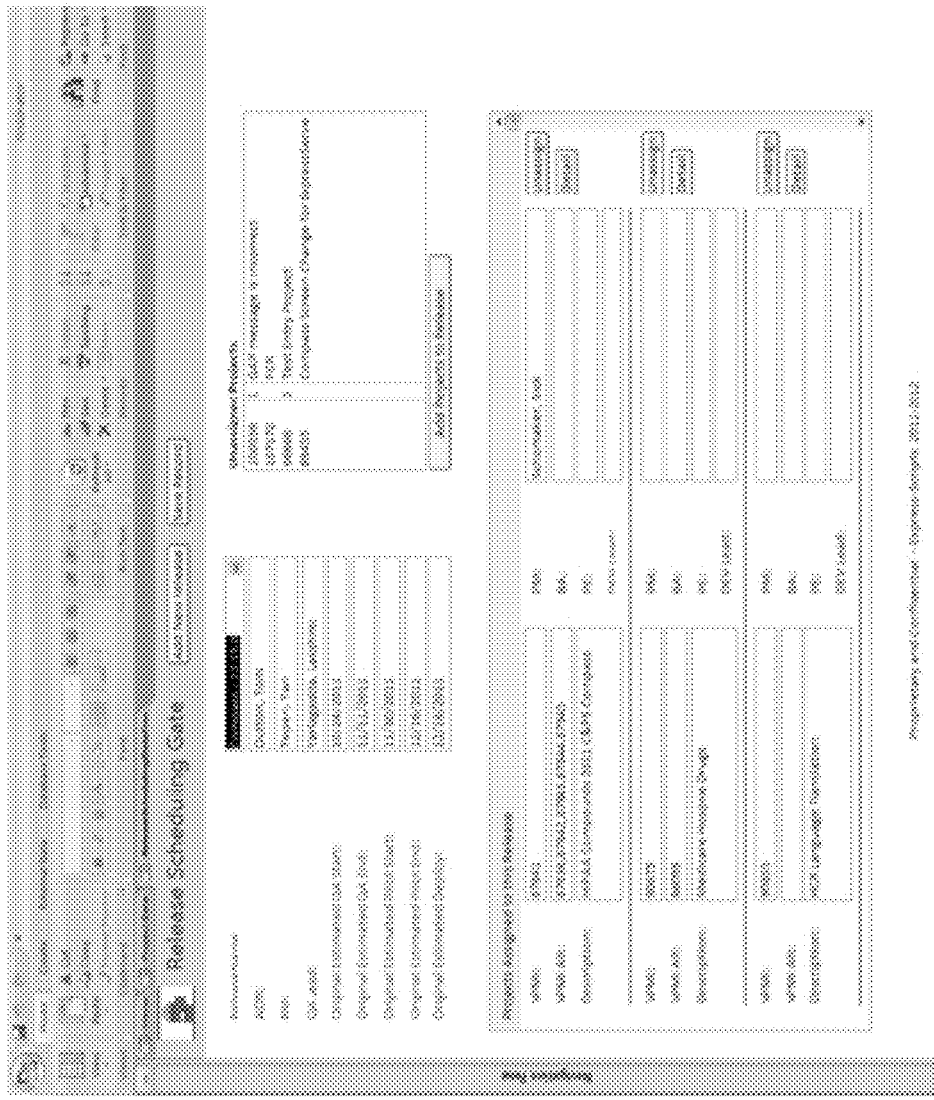

FIG. 17 includes a display 1700 in which the user may assign a project to a release and therefore add its risk profile to the release risk profile calculation. It also allows some editing of release specific data.

Figure 18:
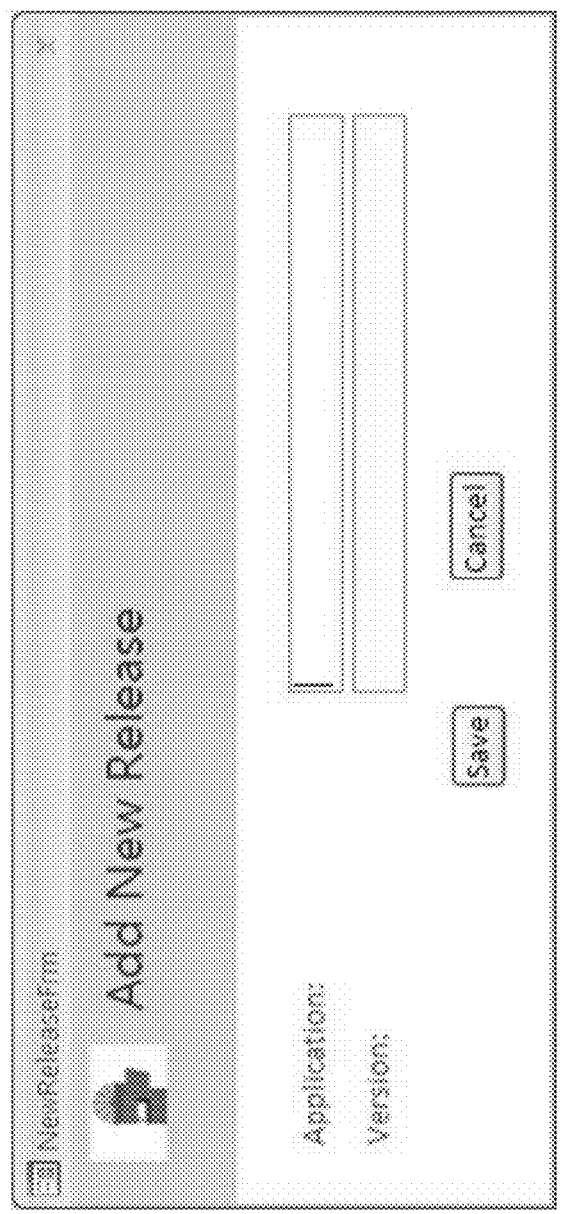

FIG. 18 includes a display 1800 that allows user to add a release into the system.

Figure 19:
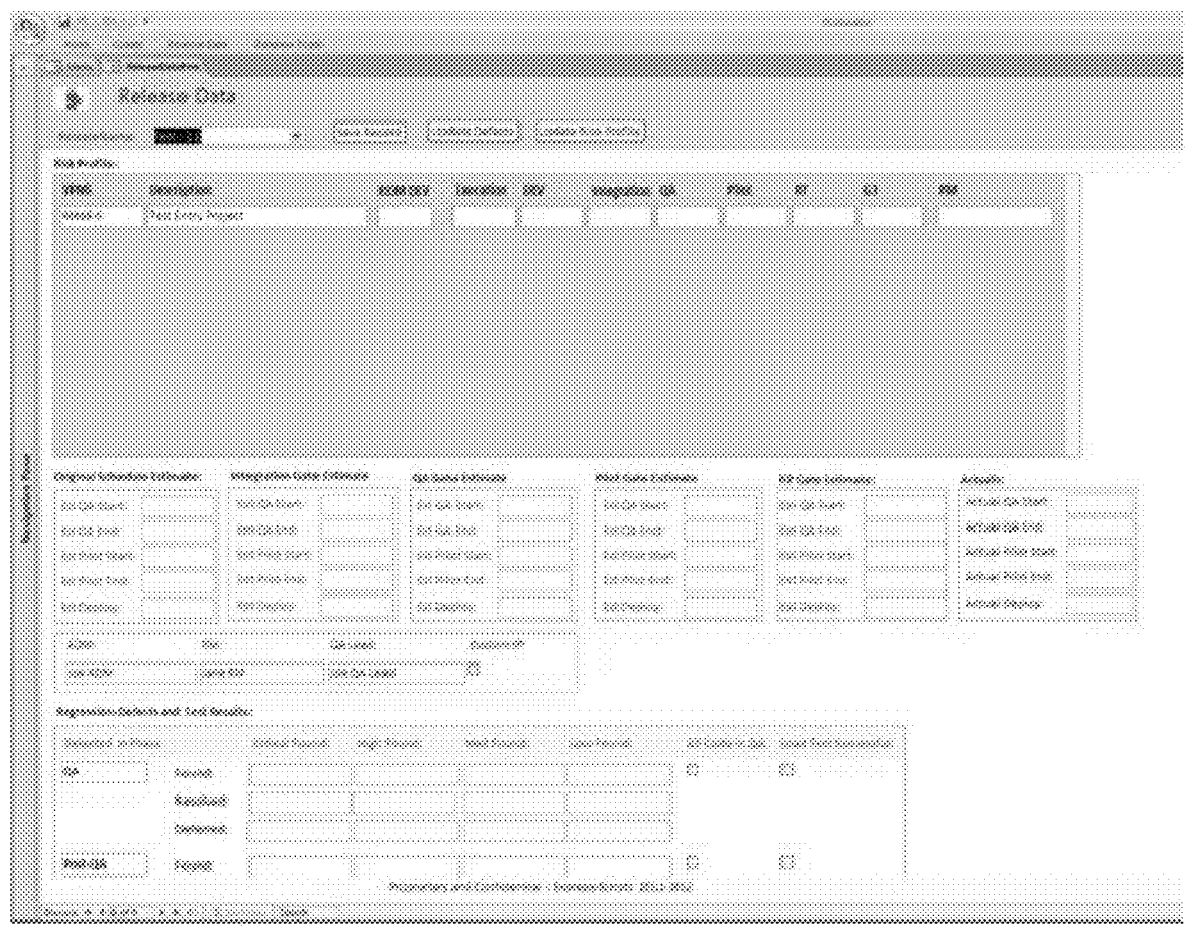

FIG. 19 includes a display 1900 that includes a composite view of a release and the risk profile for each project and milestone, and the risk specific data that is collected or entered/modified for the release. The QA defect data is collected via a linked table and query to an HP QualityCenter application. In some embodiments, the display 1900 is an example of automated data collection from an independent application).

What If?

What-if scenarios allow the manager to look ahead at the impact of any changes to the project and how the risk score will be affected.

To create what-if scenarios for risk mitigation or to analyze the impact of changes to the project, enter data into the future gates as best as possible. The future gate and intermediate gates may be filled out completely with estimated data based on current knowledge. Check the Gate Complete box and recalculate the profile.

Why won't the score decrease enough to be green at G3?

Some risks cannot be mitigated with the current SDLC methodology and practice.

Identifiable issues with software behavior, results, or product design may be commonly "defects". Defects may be detected, catalogued, evaluated for severity, assigned a root cause and time of introduction, and have an identifiable solution. In some embodiments, defects can be attributed, for example, to specific gaps in the software development process, errors in communication, or gaps in knowledge, and therefore may not only be correctable in a specific project context, but may offer the possibility of future improvements of a broader and more impactful nature.

In an embodiment, risk may include a probability of a negatively impacting event occurring over a unit of time. For example, risk may include a mathematical probability of a defect occurring once a product has been deployed. In some embodiments, risk may include a corresponding level of confidence in the accuracy of the prediction.

The mathematics behind developing a risk profile or overall score may be based on a simple summation of quantified risk factors, modified by an adjustable coefficient (e.g., a weighting factor) to account for the relative impact of the factor on overall risk. Some factors may be truly non-linear factors, and thus may require a more complex treatment. In an embodiment, correlation between actual Delivered Quality and the risk prediction model may inform the values of the coefficients. Multiple regression techniques may be used to adjust the coefficients as data becomes available.

Figure 20:
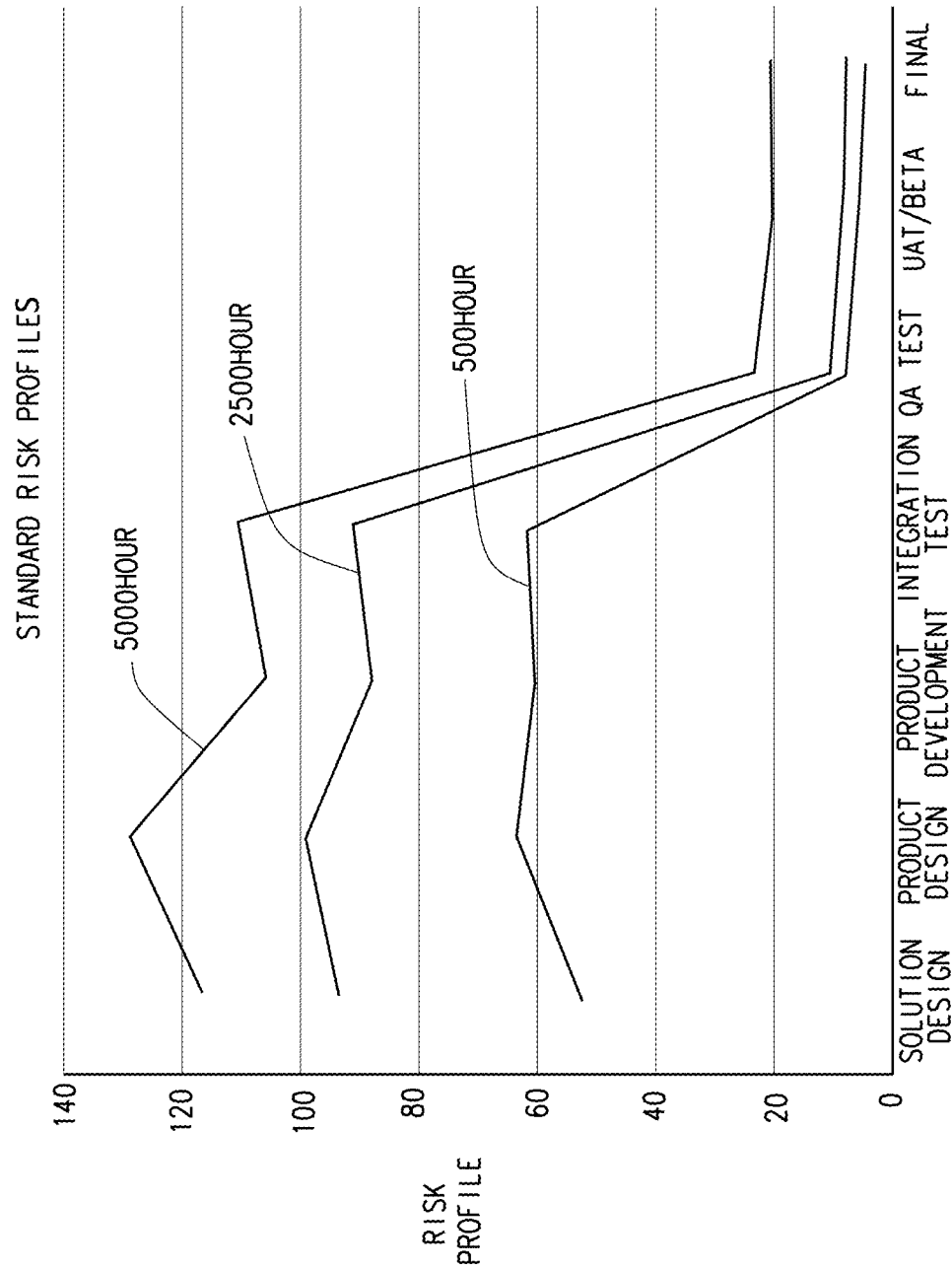

FIG. 20 includes a display 2000 including a chart with "most probable case" scenarios for different sized projects.

Size of projects is in terms of Development hours. In general, the larger the project the larger the risk involved so projects under study are compared to project "most probable case" for the same general size. The shapes of the time-based profile (lines on the chart) are roughly the same due to the nature of risks in the system (company, department, group, methodology) being modeled. In some embodiments, risk is highest when planning is completed and falls as plans are put into reality. Most risk is mitigated through testing (although this is not always the case). These profiles are generated by statistical analysis of historical data.

The display 2000 includes a graph of standard risk profiles is generally depicted. In some embodiments, modeling the risk profile for a typical high quality project across the entire lifecycle of the project, may generally provide a risk provide having a particular shape to the curve. As shown, this shape may be repeated over and over again for various projects. The risk profile curve may often only vary based on the initial size/complexity of the project.

The chart depicted in FIG. 20 may include three lines representing embodiments of standard high quality projects of 5000 Development hours (top line), of a 2500 Development hours (middle line), and 500 Development hours (bottom line). As shown by the graph in FIG. 18, one factor in analyzing risk profiles may include size and complexity. In an embodiment, a factor in the risk profile may include the size and complexity of the project. Larger projects may typically have more risk. In an embodiment, it may be possible to measure the size and complexity of the project in a simple, rough, but effective manner, e.g., in terms of total DEV Hours. In some instances, there may be support in industry practice for this type of measurement.

As shown, each line in the graph of FIG. 18 may start with an initial risk profile taken at the turnover of Solution design to Product Design. This risk may be deflated due to unknowns.

As the project passes through Product Design, unknowns may be resolved and additional risk measurements may be taken, which may have the net effect of raising the risk profile.

As the project progresses beyond Product Design, the Development phase may be entered, where no new risks should be introduced in a high quality project. However unit test and code review may mitigate somewhat. In an Agile development environment, this may not be wholly true, since requirements can change, however taking the simple approach and ignore impacts of Agile methodology, the net effect may be a drop in risk.

In the Integration Test phase, a rise in the risk profile may be realized as defects are uncovered. Even though defects may be resolved in practice, in some embodiments poorly executed code may produce more defects in the final product, and so the risk may increase when defects are uncovered. This may be quantified by a "leakage" factor.

In QA testing, a sharp drop-off of risk may be realized as defects are both uncovered and resolved. As QA testing often may not cover 100% of the application due to time constraints, a leakage factor may still be encountered. Otherwise, an almost a zero defect product may be expected. In an experimental manner, the number of defects found during QA has been correlated with the number of defects found in production and have determined a value for the leakage factor of about 3-5% depending on the application.

UAT or Beta testing may reduce risk further in a high quality project, but often not by much. In an ideal theoretical embodiment, UAT would not uncover many defects and thus may have little risk mitigation associated with it. However, large increase in risk may be expected if defects were found during UAT, so the contribution to risk is biased to the negative.

The Final value may be shaped largely by the deferment of defects that could not be resolved, so a small uptick can be seen for the larger projects which typically have deferred defects.

Because project standard profiles may vary due to their size, the values may be normalized by assessing the difference between a standard, high quality project and a subject project (e.g., a project for which risks may be analyzed). The result may include a risk profile differential having a flat line of near zero for a high quality project of comparable size. Deviation above and below the line may be the basis for risk monitoring output. A sample 5000 hour subject project with increased integration test defects and additional deferred defects is shown in FIG. 19 compared to the standard high quality project baseline.

As shown, the raw data curves may display only slight deviations due to graphical scale considerations. The red delta curve (e.g., the bottom line of the illustrated graph) may ignore total values and may only display differences, may depict the variation in greater relief.

In an embodiment, a model of risk factors and coefficients may be built based on historical experience and observation. An historical analysis may be applied to help improve the model. Due to the lack of accurate historical data, conclusion may require a degree of circumspection, but may assist in bringing some values into better alignment. The best improvements may be realized during a pilot phase when purposeful measurements can be made with some certain accuracy.

In an embodiment, candidates of risk may include:
1. Size and complexity (initial)
2. Milestone dates and project plans compared to estimates for a quality product
3. Quality (subjectively scored) of Business Requirements
4. Quality (subjectively scored) of Solution and High Level Design
5. Quality (subjectively scored) of Resource plans
6. Team experience and Subject Matter expertise
7. Unit Test Coverage %
8. QA Test Coverage %
9. Scope changes, additions, deletions and the timeframe in which they are made
10. DEV Hour overruns or under runs
11. Out of Band (non-code) related tasks and complexity
12. Changes to scheduled milestones
13. Key Resource turnover
14. Integration Defects found, resolved
15. QA defects found, resolved
16. Load testing results
17. QA test completeness %
18. External dependency can meet schedule
19. Defects deferred into next release
20. Implementation Plan review and completeness Each of the candidates of risk may be measured during the appropriate phase, and several risks may be measures throughout multiple phases. Some candidates may be determined to be irrelevant and/or may have an understated impact. Additionally, new candidates may be during the process. Adjustments to the model may be expected and may be part of the design, as such adjustments may be made to adapt to changing process, application and technology improvements, etc.

Some embodiments may include non-linear factors, which may, in some embodiments, be treated individually with a mathematical formula to approximate impact. For example, such a factor may include QA test completeness. For example, in some embodiments, conducting more than the planned QA testing may decreases the risk, but may not decrease the risk as much as the planned testing, with diminishing returns. In some embodiments, the relationship between the percentage of testing complete and risk may be non-linear and may be more likely exponential (e.g., if the impact of not completing 5% of testing is compared to not completing 10%, the risk may be significantly more than double).

Figure 21:
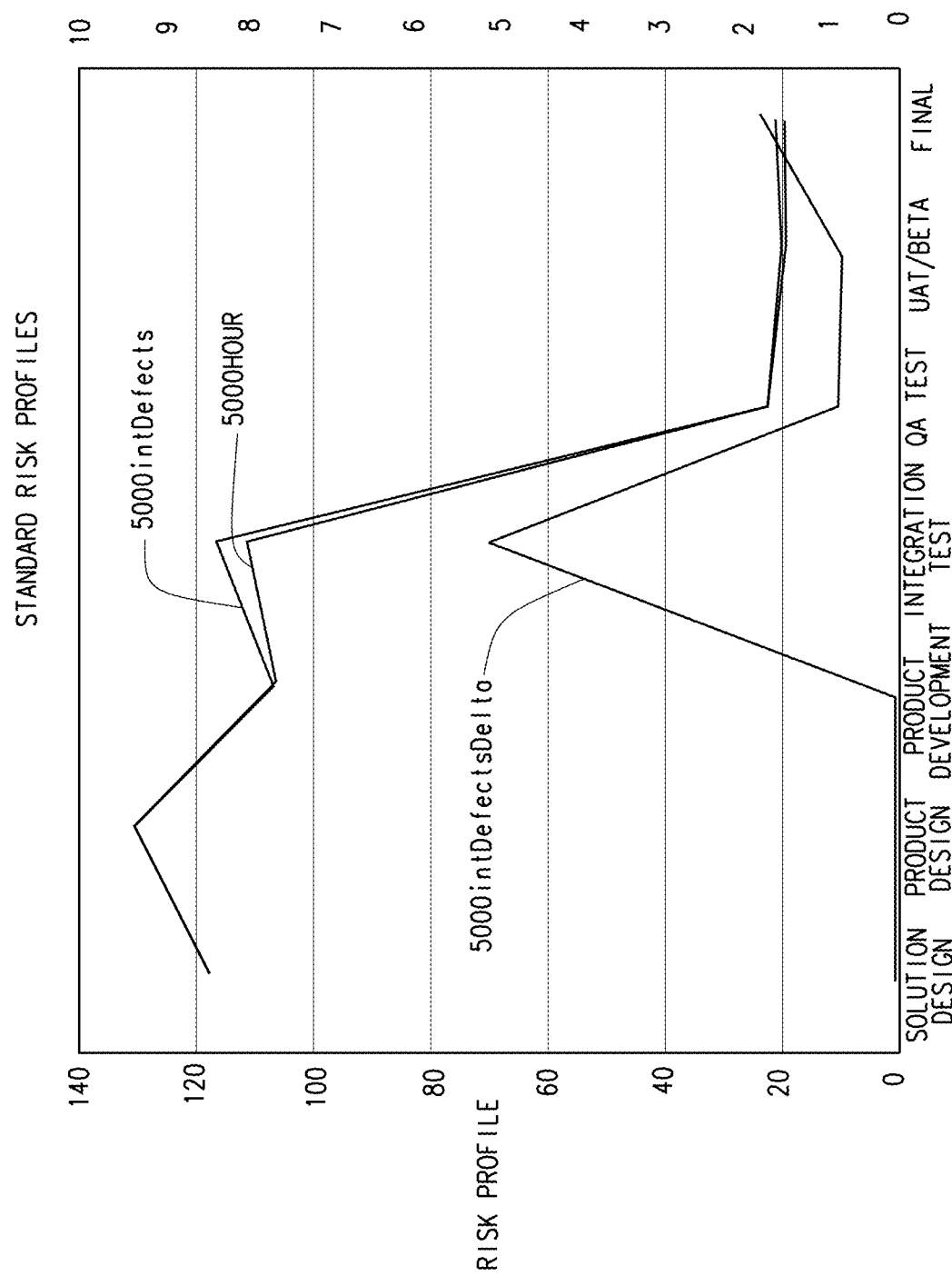

FIG. 21 includes a display 2100 including a 5000 hour "most probable case" scenario in green. Same scenario with more than expected number of integration milestone defects in blue. The red line shows the mathematical difference between the two scenarios. A flat line at y-axis value zero would represent no difference. This differencing technique amplifies the effect of the unexpected defects visually.

Figure 22:
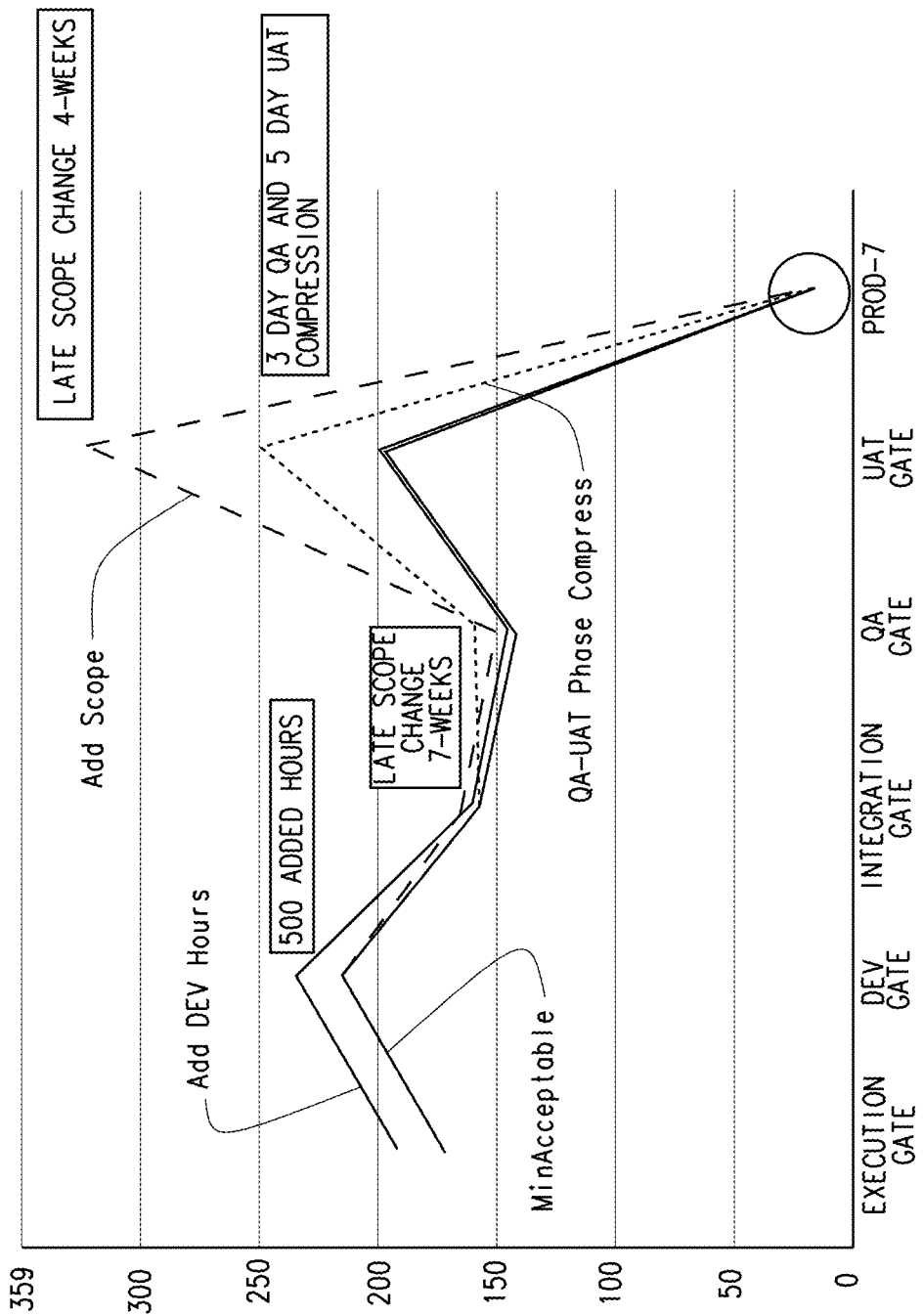

Referring to FIG. 22, a graph is shown depicting changes in risk scores in response to various risk factor attributes associated with different segments of the software application development lifecycle. FIG. 22 reflects a sample project with a "minimum acceptable risk profile" in blue is shown. (acceptability determined by company management). Various other scenarios demonstrating risk factors that have unexpected values are shown in Red, Green, and Purple, with the dashed lines showing the impact of risks occurring in the later stages of the process. The circle shows a seeming convergence at the end of the process, but this is matter of scale of the chart.

Figure 23:
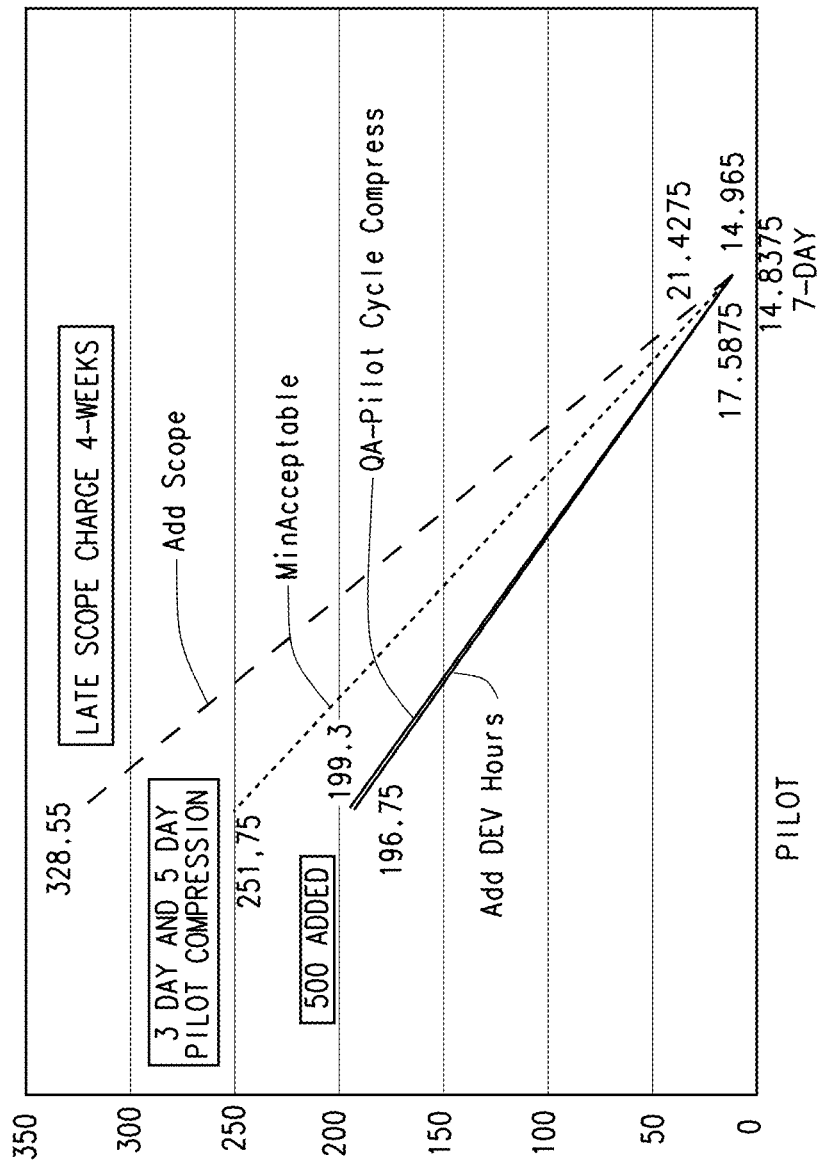

FIG. 23 depicts the trends of the graph shown in FIG. 22 during the circles Prod-7 time frame of FIG. 22. As shown the various graphs may generally converge in the indicated 7-day period. FIG. 23 reflects the final risk factor calculations at a milestone 7 days before release. The variation in values are smaller due to the mitigating impacts of testing, however the differences still remain and may be considered significant. The added scope scenario has a risk profile of 21.4 where the minimum acceptable risk profile is 14.9.

Figure 24:
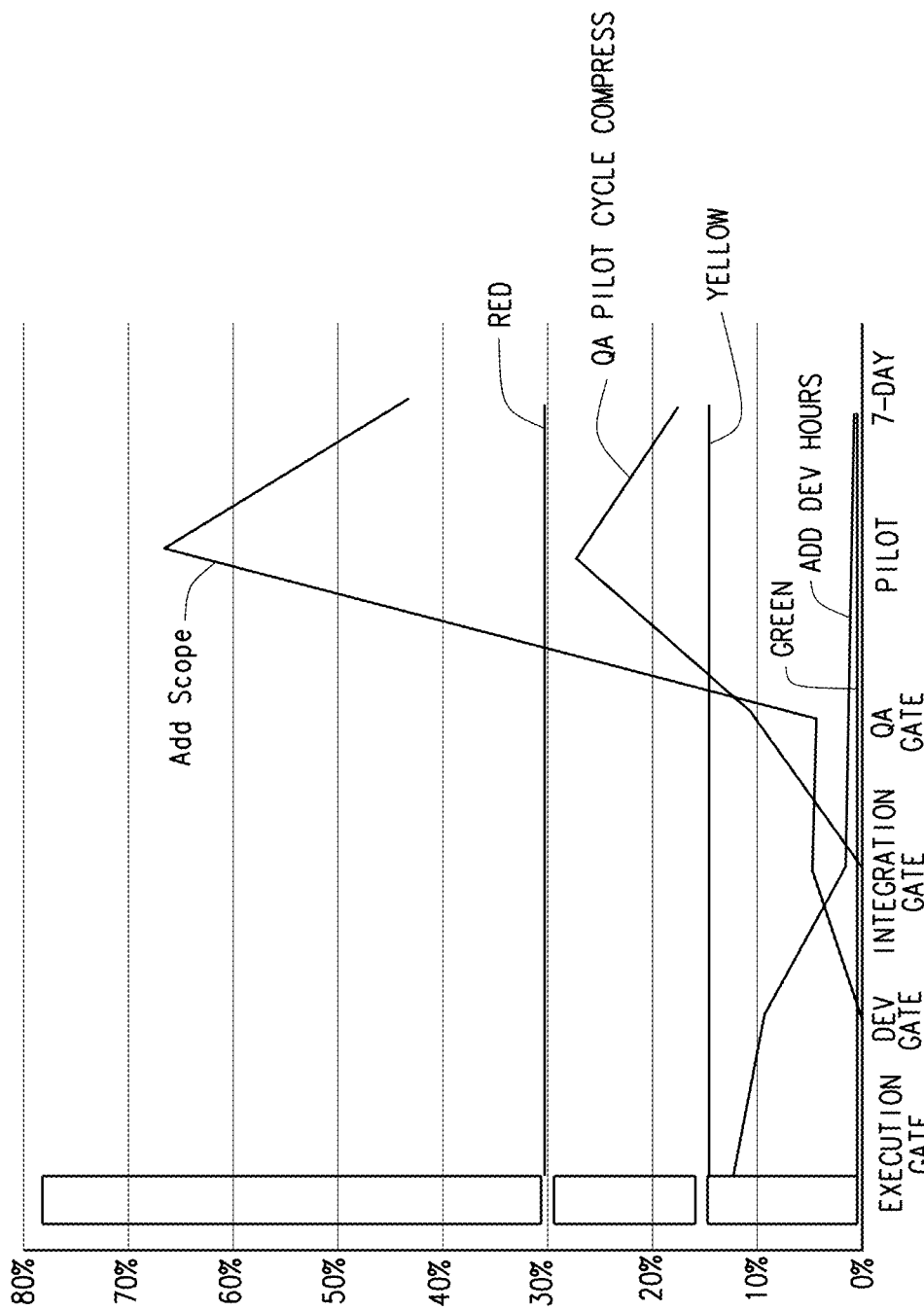

FIG. 24 includes a display 2400 that includes a different view of the data in the display 2100 normalized for scale. Also added to the display 2400 are thresholds of concern (red yellow green on the y axis). The late scope add scenario may show the most difference and ends up in the Red concern zone.

The analysis subsystem 202 generates these values and may create reporting similar to FIG. 24 and determine which risk factors and in what proportion caused the risk profile to stray from a standard profile which is pre-selected. Typically the pre-selected profile is the minimum acceptable standard.

Figure 25:
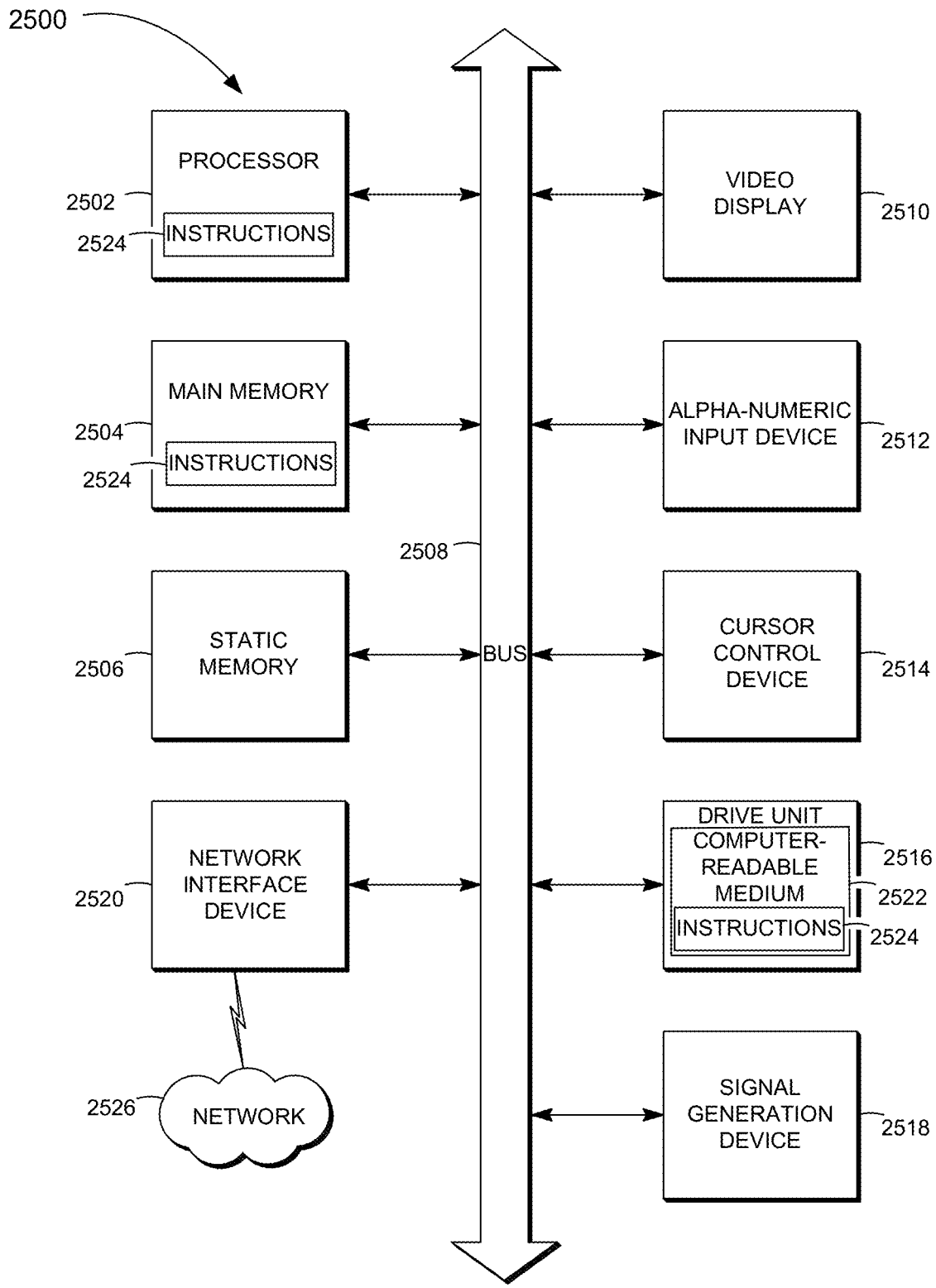
FIG. 25 is a block diagram of a machine in the example form of a computer system within which a set of instructions for causing the machine to perform any one or more of the methodologies discussed herein may be executed or stored.

FIG. 25 shows a block diagram of a machine in the example form of a computer system 2500 within which a set of instructions may be executed causing the machine to perform any one or more of the methods, processes, operations, or methodologies discussed herein. The user device 102 and/or the development device 106 may include the functionality of the one or more computer systems 2500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU) a graphics processing unit (GPU) or both), a main memory 2504 and a static memory 2506, which communicate with each other via a bus 2508. The computer system 2500 further includes a video display unit 2510 (e.g., a liquid crystal display (LCD) or a cathode ray tube (CRT)). The computer system 2500 also includes an alphanumeric input device 2512 (e.g., a keyboard), a cursor control device 2514 (e.g., a mouse), a drive unit 2516, a signal generation device 2518 (e.g., a speaker) and a network interface device 2520.

The drive unit 2516 includes a computer-readable medium 2522 on which is stored one or more sets of instructions (e.g., software 2524) embodying any one or more of the methodologies or functions described herein. The software 2524 may also reside, completely or at least partially, within the main memory 2504 and/or within the processor 2502 during execution thereof by the computer system 2500, the main memory 2504 and the processor 2502 also constituting computer-readable media.

The software 2524 may further be transmitted or received over a network 2526 via the network interface device 2520.

While the computer-readable medium 2522 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations.

In an example embodiment, a plurality of risk factor questions associated with a software development process of a software program is generated during a software development stage in which the software program is being created or will be created. A risk factor question requests information utilized to assess software development risk associated with a particular software development activity. A plurality of risk factor responses associated with the software development process of the software program is received. A risk factor response of the plurality of risk factor responses is a response to the risk factor question. A risk factor is associated with the risk factor response and reflects a quantitative software development risk associated with the software development process.

A plurality of risk factors is respectively associated with a plurality of risk factor models and a plurality of risk factor weightings. The plurality of risk factors includes the risk factor. A risk factor model of the plurality of risk factor models reflects a mathematical relationship between the risk factor and a risk factor weighting.

The plurality of risk factors are totaled in combination with their respective association of the plurality of risk factor models and the plurality of risk factor weightings to generate a predicted number of expected software development defects associated with continued development of the software program.

In an example embodiment, risk factor data of a plurality of risk factors associated with the software development process of a software program is received. A risk factor of the plurality of risk factors reflects a quantitative software development risk associated with a software development process of a software program during a software development stage in which the software program is being created or will be created.

The plurality of risk factors is respectively associated with a plurality of risk factor models and a plurality of risk factor weightings, a risk factor model of the plurality of risk factor models reflecting a mathematical relationship between the risk factor and a risk factor weighting. The plurality of risk factors are totaled in combination with their respective association of the plurality of risk factor models and the plurality of risk factor weightings to generate a predicted number of expected software development defects associated with continued development of the software program.

In an example embodiment, a risk factor associated with a software development project is identified. A weighting factor associated with the risk factor is determined. A risk value associated with the software development project is determined based on the risk factor and the weighting factor associated with the risk factor.

Thus, methods and systems for analyzing software development risks have been described. Although embodiments of the inventive subject matter have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A software analysis system for analyzing software development risk by predicting defects in software development, comprising:
   a software development server including a processor and a memory; and
   an analysis server including an analysis processor and an analysis memory, wherein the analysis server is in communication with the software development server, wherein the analysis processor is configured to:
      obtain, from the software development server, a set of prior development data representative of prior software development projects;
      identify a set of historical risk factors, wherein the set of historical risk factors is determined based on historical data derived from the set of prior development data, wherein the set of historical risk factors is associated with a historical risk factor model;
      define a weighting factor associated with the set of historical risk factors and the historical risk factor model;
      predict a risk value in the pending software development project based on at least the set of historical risk factors, and the weighting factor, the risk value indicating a level of risk of a particular defect occurring when the pending software development project is deployed;
      flag a software development risk area;
      generate a notification based on the flag of the software development risk area; and
      generate at least one suggested developmental solution based on the flag of the software development risk area to mitigate the level risk of the particular defect.

2. The software analysis system of claim 1, wherein the analysis processor is further configured to:
   generate the historical risk factor model of historical risk factors, based on the set of prior development data, reflecting a mathematical relationship between a set of weighting factors and the set of historical risk factors; and
   define the weighting factor associated with the set of historical risk factors and the historical risk factor model.

3. The software analysis system of claim 1, wherein the analysis processor is further configured to:
   obtain an additional set of prior development data associated with additional prior software development projects; and
   apply at least one analytical technique to the additional set of prior development data and the weighting factor to refine the weighting factor.

4. The software analysis system of claim 1, wherein the analysis processor is further configured to:
   obtain the set of prior development data, where the set of prior development data includes data from previous stages of the pending software development project; and
   identify the set of historical risk factors in part based on data from previous stages of the pending software development project.

5. The software analysis system of claim 1, wherein the analysis processor is further configured to determine a predicted number of defects associated with the pending software development project.

6. The software analysis system of claim 5, wherein the analysis processor is further configured to:
- identify a threshold maximum number of software application defects in the pending software development project;
- determine whether the predicted number of defects exceeds the threshold maximum number; and
- transmit an alert that the threshold maximum number is exceeded to proactively engage risk mitigation processes.

7. The software analysis system of claim 1, wherein the analysis processor is further configured to provide a confidence level associated with the predicted risk value.

8. A method for analyzing software development risk by predicting defects in software development, the method performed by a computer processor of an analysis server, the method comprising:
- obtaining, by the computer processor, a set of prior development data representative of prior software development projects;
- identifying, by the computer processor, a set of historical risk factors, wherein the set of historical risk factors is determined based on historical data derived from the set of prior development data, wherein the set of historical risk factors is associated with a historical risk factor model;
- defining a weighting factor associated with the set of historical risk factors and the historical risk factor model;
- predicting a risk value in the pending software development project based on at least the set of historical risk factors and the weighting factor, the risk value indicating a level of risk of a particular defect occurring when the pending software development project is deployed;
- flagging a software development risk area;
- generating a notification based on the flag of the software development risk area; and
- generating at least one suggested developmental solution based on the flag of the software development risk area to mitigate the level of risk of the particular defect.

9. The method of claim 8, further comprising:
- generating the historical risk factor model of historical risk factors, based on the set of prior development data, reflecting a mathematical relationship between a set of weighting factors and the set of historical risk factors; and
- defining the weighting factor associated with the set of historical risk factors and the historical risk factor model.

10. The method of claim 8, further comprising:
- obtaining an additional set of prior development data associated with additional prior software development projects; and
- applying at least one analytical technique to the additional set of prior development data and the weighting factor to refine the weighting factor.

11. The method of claim 8, further comprising:
- obtaining the set of prior development data, where the set of prior development data includes data from previous stages of the pending software development project; and
- identifying the set of historical risk factors in part based on data from previous stages of the pending software development project.

12. The method of claim 8, wherein predicting a risk value in the pending software development project further comprises determining a predicted number of defects associated with the pending software development project.

13. The method of claim 12, further comprising:
- identifying a threshold maximum number of software application defects in the pending software development project;
- determining whether the predicted number of defects exceeds the threshold maximum number; and
- transmitting an alert that the threshold maximum number is exceeded to proactively engage risk mitigation processes.

14. The method of claim 8, further comprising providing a confidence level associated with the predicted risk value.

15. An analysis server including an analysis processor and an analysis memory, wherein the analysis server is in communication with the software development server, wherein the analysis processor is configured to:
- obtain, from the software development server, a set of prior development data representative of prior software development projects;
- identify a set of historical risk factors, wherein the set of historical risk factors is determined based on historical data derived from the set of prior development data, wherein the set of historical risk factors is associated with a historical risk factor model;
- define a weighting factor associated with the set of historical risk factors and the historical risk factor model;
- predict a risk value in the pending software development project based on at least the set of historical risk factors and the weighting factor, the risk value indicating a level of risk of a particular defect occurring when the pending software development project is deployed;
- flag a software development risk area;
- generate a notification based on the flag of the software development risk area; and
- generate at least one suggested developmental solution based on the flag of the software development risk area to mitigate the level of risk of the particular defect.

16. The analysis server of claim 15, wherein the analysis processor is further configured to:
- generate historical risk factor model of historical risk factors, based on the set of prior development data, reflecting a mathematical relationship between a set of weighting factors and the set of historical risk factors; and
- define the weighting factor associated with the set of historical risk factors and the historical risk factor model.

17. The analysis server of claim 15, wherein the analysis processor is further configured to:
- obtain an additional set of prior development data associated with additional prior software development projects; and
- apply at least one analytical technique to the additional set of prior development data and the weighting factor to refine the weighting factor.

18. The analysis server of claim 15, wherein the analysis processor is further configured to:
- obtain the set of prior development data, where the set of prior development data includes data from previous stages of the pending software development project; and
- identify the set of historical risk factors in part based on data from previous stages of the pending software development project.

19. The analysis server of claim 15, wherein the analysis processor is further configured to determine a predicted number of defects associated with the pending software development project.

20. The analysis server of claim 19, wherein the analysis processor is further configured to:
- identify a threshold maximum number of software application defects in the pending software development project;
- determine whether the predicted number of defects exceeds the threshold maximum number; and
- transmit an alert that the threshold maximum number is exceeded to proactively engage risk mitigation processes.

* * * * *